(12) United States Patent
Chang et al.

(10) Patent No.: US 11,036,081 B2
(45) Date of Patent: Jun. 15, 2021

(54) DISPLAY DEVICE

(71) Applicant: INNOLUX CORPORATION, Jhu-Nan (TW)

(72) Inventors: Chi-Liang Chang, Jhu-Nan (TW); Chao-Chun Huang, Jhu-Nan (TW); Chen-Chia Wu, Jhu-Nan (TW); Chao-Fang Chung, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/798,983

(22) Filed: Feb. 24, 2020

(65) Prior Publication Data

US 2020/0192157 A1 Jun. 18, 2020

Related U.S. Application Data

(63) Continuation of application No. 15/672,500, filed on Aug. 9, 2017, now abandoned.

(30) Foreign Application Priority Data

Aug. 12, 2016 (CN) .......................... 201610658883.4
May 23, 2017 (CN) .......................... 201710368885.4

(51) Int. Cl.
*F21V 8/00* (2006.01)
*G02F 1/13357* (2006.01)

(52) U.S. Cl.
CPC ....... *G02F 1/133603* (2013.01); *G02B 6/002* (2013.01); *G02B 6/0011* (2013.01);
(Continued)

(58) Field of Classification Search
CPC ........ G02B 6/002–0021; G02B 6/0073; G02B 6/0011–0095; G02F 1/133615
See application file for complete search history.

(56) References Cited

U.S. PATENT DOCUMENTS

| 8,696,183 B2 * | 4/2014 | Huang ................. G02B 6/0033 362/608 |
| 2007/0147074 A1 * | 6/2007 | Sakai ................... G02B 6/0055 362/608 |

(Continued)

FOREIGN PATENT DOCUMENTS

| CN | 101922660 A | 12/2010 |
| CN | 104145199 A | 11/2014 |
| CN | 105278028 A | 1/2016 |

*Primary Examiner* — Sean P Gramling
(74) *Attorney, Agent, or Firm* — Muncy, Geissler, Olds & Lowe, P.C.

(57) ABSTRACT

A backlight module includes a light guiding unit having a light input surface and a light-emitting unit having light-emitting elements disposed along a first direction and adjacent to the light input surface. A second direction is from the light input surface to the light-emitting unit. A first protruding portion of the light guiding unit includes a sharp protrusion tip at the bottom surface and a part of the light input surface. A curved convex connecting surface of the light input surface connects to the first protruding portion to form a turning portion which is disposed between the connecting surface and the first protruding portion, and is at its intermediate portion and outwardly protrudes toward the light-emitting elements along the second direction. The light-emitting elements are across from the connecting surface and generally positioned above the first protruding portion in the third direction.

20 Claims, 19 Drawing Sheets

(52) U.S. Cl.
CPC ..... *G02B 6/0068* (2013.01); *G02F 1/133605* (2013.01); *G02F 1/133615* (2013.01)

(56) References Cited

U.S. PATENT DOCUMENTS

2008/0285310 A1*  11/2008  Aylward .............. G02B 6/0068
    362/626
2010/0214509 A1*  8/2010  Sasaki ................. G02B 6/0021
    349/65
2012/0020113 A1  1/2012  Zheng et al.

* cited by examiner

DISPLAY DEVICE

CROSS REFERENCE TO RELATED APPLICATIONS

This Non-provisional application is a continuation application of U.S. application Ser. No. 15/672,500, which claims priority under 35 U.S.C. § 119(a) on Patent Application No(s). 201610658883.4 filed in People's Republic of China on Aug. 12, 2016, and 201710368885.4 filed in People's Republic of China on May 23, 2017, the entire contents of which are hereby incorporated by reference.

BACKGROUND

Technical Field

The present disclosure relates to a display device and, in particular, to a display device having a light guiding unit with a special structure.

Related Art

In the recent years, the processes and materials for manufacturing light emitting diodes (LED) have been improved, so that the luminous efficiency of LED is sufficiently enhanced. Different from the general fluorescent lamp or compact lamp, the LED lamp has the features of low power consumption, long lifetime, high safety, short response time, and small size. Accordingly, the LED lamps have been applied to the luminous apparatuses such as the indoor lamps, flashlights, headlights of vehicles, other luminous devices, or the backlight module of flat display device.

For example, the edge-type backlight module of the flat display device generally includes a light-emitting unit and a light guiding plate disposed corresponding to the light-emitting unit. The light-emitting unit includes a plurality of light-emitting diodes (LED) disposed at one side of the light guiding plate for emitting light, and the light enters the light guiding plate through a light input surface of the light guiding plate. The light guiding plate can guide the transmission direction of the light, and the light can be outputted from a light output surface of the light guiding plate based on the total reflection of the light guiding plate. Accordingly, a uniform surface light source can be provided to the display panel.

In the conventional art, the light input surface of the light guiding plate is generally a planar surface. When the light emitted from the LED enters the light guiding plate via the light input surface, the hotspot may be generated in the light guiding plate around the light input surface due to the pitch of the adjacent two LED. The undesired hotspot can affect the luminous efficiency of the backlight module and caused a poor display quality of the display device.

Therefore, it is an important subject to provide a display device that can improve the hotspot issue and/or enhance the display quality.

SUMMARY

In view of the foregoing, the present disclosure is to provide a display device. In some embodiments, the display device of the disclosure can improve the hotspot issue and/or enhance the display quality.

The present disclosure provides a display device including a display panel and a backlight module. The backlight module is disposed corresponding to the display panel and includes a light-emitting unit and a light guiding unit. The light guiding unit has a light input surface, a bottom surface and a top surface. The light input surface connects the bottom surface and the top surface. The light-emitting unit has a plurality of light-emitting elements, and the light-emitting elements are disposed along a first direction and adjacent to the light input surface. A second direction is a direction from the light input surface to the light-emitting unit. A third direction is perpendicular to the first direction and the second direction. The light guiding unit includes a first protruding portion, and the first protruding portion includes a part of the light input surface. The light input surface includes a connecting surface, and the connecting surface connects to the first protruding portion to form a turning portion. The turning portion is disposed between the connecting surface and the first protruding portion. The connecting surface is a planar surface or a curved surface protruding along the second direction, and the first protruding portion protrudes along the second direction and extends along the first direction.

The disclosure also provides a display device including a display panel and a backlight module. The backlight module is disposed corresponding to the display panel and includes a light-emitting unit and a light guiding unit. The light guiding unit has a light input surface, a bottom surface and a top surface. The light input surface connects the bottom surface and the top surface. The light-emitting unit is disposed adjacent to the light input surface. The light input surface includes at least two regions, and the two regions have different surface roughnesses.

As mentioned above, in the display device of some embodiments of the disclosure, the light guiding unit of the backlight module has at least one first protruding portion or has at least two regions with different roughnesses. Compared with the conventional light guiding unit, which has a planar light input surface, the light guiding unit of the embodiments of the disclosure has a light input surface with a modified structure for providing a light guiding function. Accordingly, when the light emitted from the light-emitting unit enters the light guiding unit, it can be guided to a place farer away from the light-emitting unit. This configuration can enhance the luminous efficiency of the backlight module and improve the hotspot issue of the backlight module, thereby increasing the display quality of the display device.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1A:
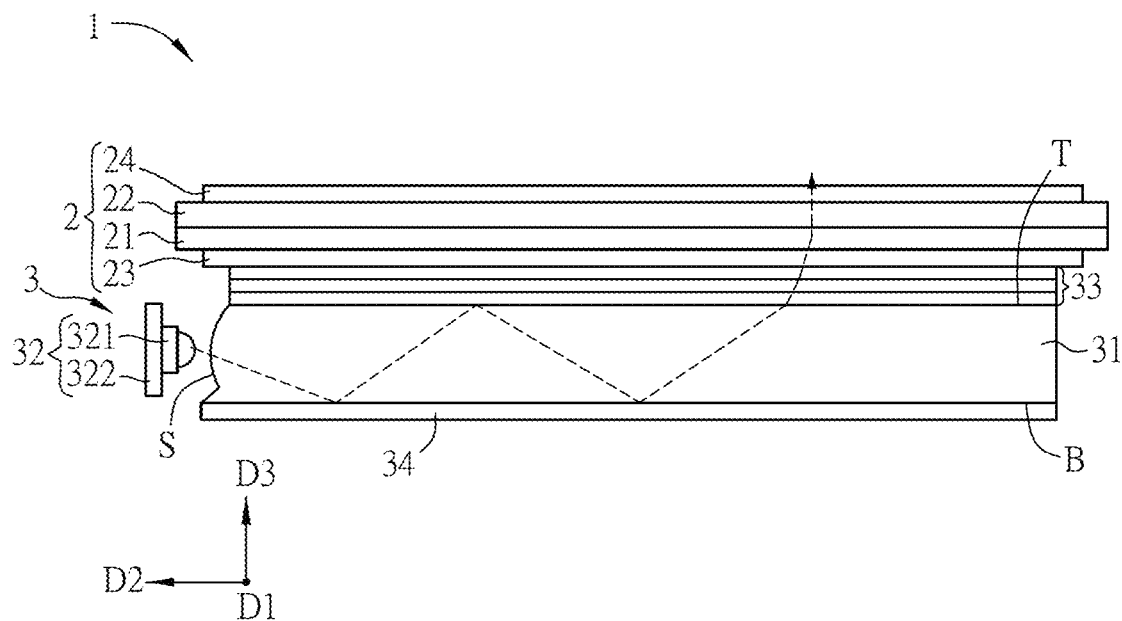
FIG. 1A is a schematic diagram showing a display device according to an embodiment of the disclosure.
Figure 1B:
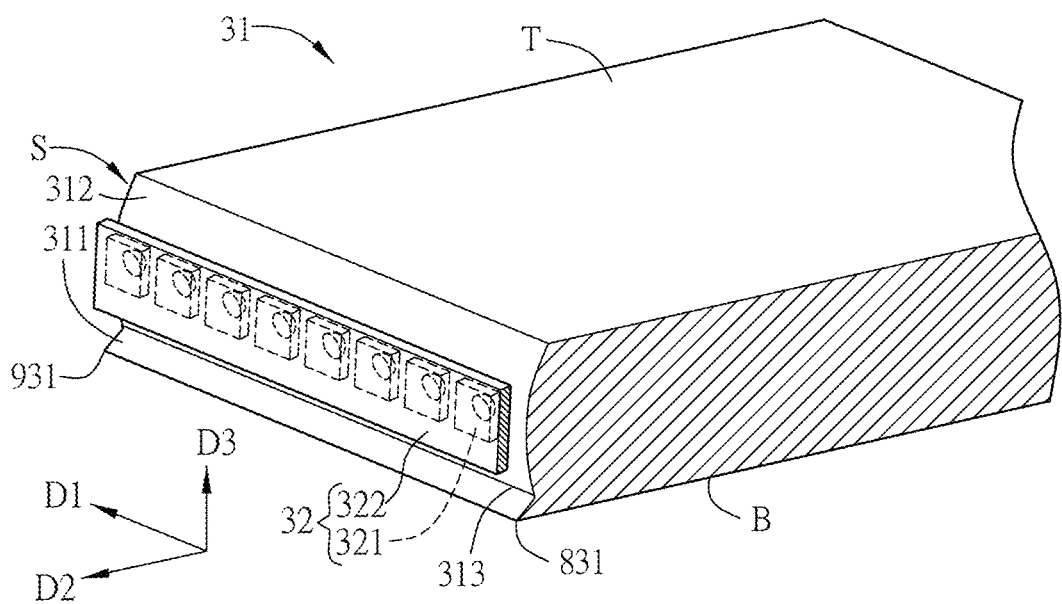
FIG. 1B is a schematic perspective diagram showing a part of the light guiding unit and the light-emitting unit in the display device of FIG. 1A.
Figure 1C:
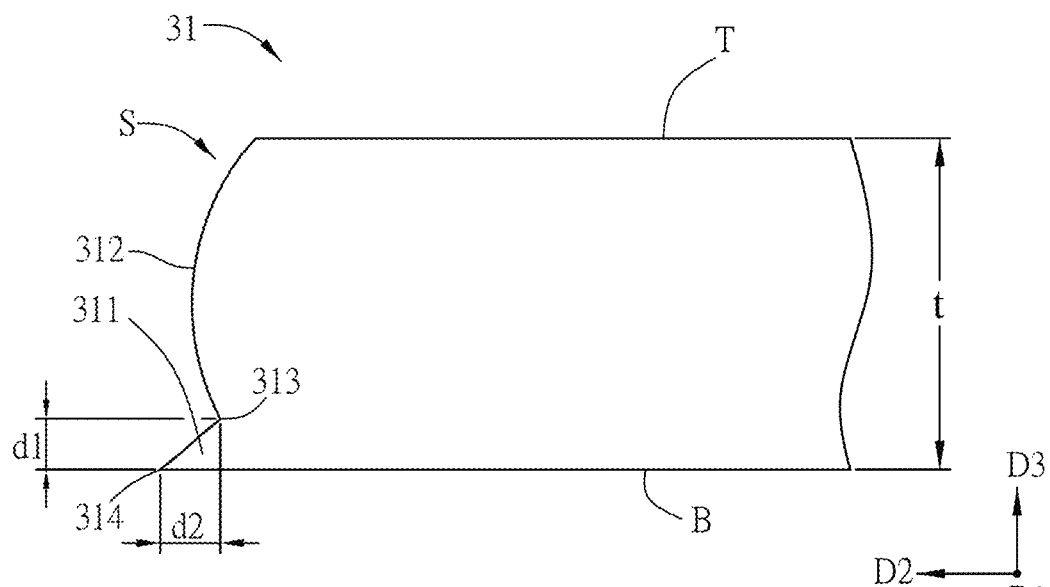
FIG. 1C is a side view of the light guiding unit in the display device of FIG. 1A.
Figure 1D:
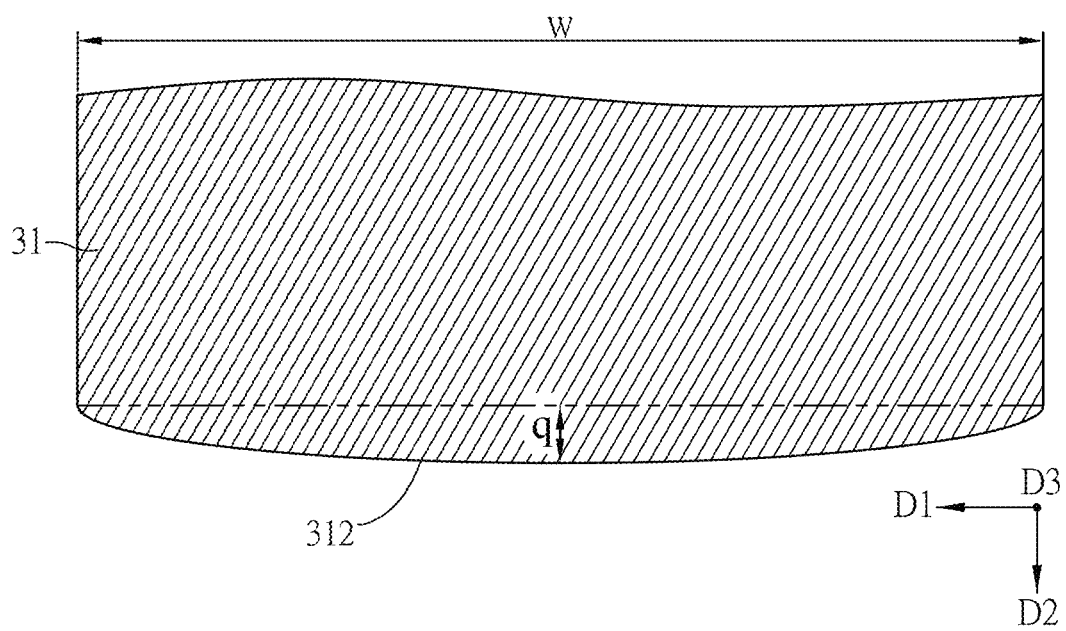
FIG. 1D is a sectional view of the light guiding unit in the display device of FIG. 1A.

FIG. 1A is a schematic diagram showing a display device 1 according to an embodiment of the disclosure. FIG. 1B is a schematic perspective diagram showing a part of a light guiding unit 31 and a light-emitting unit 32 of the display device 1 of FIG. 1A. FIG. 1C is a side view of the light guiding unit 31 of the display device 1 of FIG. 1A, and FIG. 1D is a sectional view of the light guiding unit 31 of the display device 1 of FIG. 1A.

Referring to FIGS. 1A to 1D, the display device 1 includes a display panel 2 and a backlight module 3. The backlight module 3 is disposed opposite and corresponding to the display panel 2 and is configured to emit light, which passes through the display panel 2 for displaying images. To make the description of the disclosure more comprehensive, the figures show a first direction D1, a second direction D2 and a third direction D3, which are substantially perpendicular to one another. For example, the first direction D1 is substantially parallel to the extending direction of the scan lines of the display panel 2, the second direction D2 is substantially parallel to the extending direction of the data lines of the display panel 2, and the third direction D3 is substantially perpendicular to the first direction D1 and the second direction D2. In this embodiment, the display panel 2 can be an FFS (Fringe Field Switching) liquid crystal display panel, an IPS (In Plane Switching) type liquid crystal display panel, a TN (Twisted Nematic) type liquid crystal display panel, a VA (Vertical Alignment) type liquid crystal display panel, or other types of liquid crystal display panels. This disclosure is not limited. Besides, the display device of this embodiment can be a flexible display device, a touch display device, or a curved display device, and this disclosure is not limited.

As shown in FIG. 1A, the display panel 2 includes a first substrate 21, a second substrate 22, a display layer (not shown), and two polarizers 23 and 24. The first substrate 21 is disposed opposite to the second substrate 22, and the display layer is disposed between the first substrate 21 and the second substrate 22. In this embodiment, the first substrate 21 is a TFT (thin-film-transistor) substrate, and the second substrate 22 is a CF (color filter) substrate. In other embodiments, the black matrix of the CF substrate or the filter layer can be formed on the TFT substrate, and the first substrate 21 becomes a BOA (BM on array) substrate or a COA (color filter on array) substrate. This disclosure is not limited.

The polarizer 23 is a lower polarizer, and the polarizer 24 is an upper polarizer. The polarizer 23 (lower polarizer) is disposed at one side of the first surface 21 away from the second substrate 22, and the polarizer 24 (upper polarizer) is disposed at one side of the second substrate 22 away from the first substrate 21. The first polarizer 23 is disposed on the lower surface of the first substrate 21, and the second polarizer 24 is disposed on the upper surface of the second substrate 22. The polarizing axes of the two polarizers 23 and 24 substantially have a phase difference of 90 degrees for providing a shielding function to the light source. The light characteristics can be modulated by controlling the intensity of the electric field to bias the liquid crystals o enable the display panel 2 to display images.

The backlight module 3 includes a light guiding unit 31 and a light-emitting unit 32. In addition, the backlight module 3 further includes at least one optical film 33 and a reflective element 34.

The light guiding unit 31 has at least one side surface and a bottom surface B and a top surface T, which are connected to the side surface. In this embodiment, the bottom surface B is disposed corresponding to and opposite to the top surface T. The light enters the light guiding unit 31 through the side surface, which is a light input surface S, and the light leaves the light guiding unit 31 via the top surface T, which is a light output surface. The backlight module 3 is an edge-type backlight module.

The light guiding unit 31 is configured for guiding the transmission direction of the light. The light will have total reflection inside the light guiding unit 31, and the light can enter the light guiding unit 31 via the light input surface S and be outputted via the top surface T. In this embodiment, the light guiding element 31 is made of transparent materials, such as acrylic resin, polycarbonate, polyethylene resin, or glass, and this disclosure is not limited. In addition, the cross-section of the light guiding element 31 may have a plate shape or a wedge shape. In this embodiment, the cross-section of the light guiding element 31 has a plate shape.

The light-emitting unit 32 is disposed adjacent to the light input surface S (the side surface) of the light guiding unit 31, and the light emitted from the light-emitting unit 32 enters the light guiding unit 31 through the light input surface S. Then, the light leaves the light guiding unit 32 through the top surface T and passes through the optical film 33 and the display panel 2. As shown in FIG. 1B, the light-emitting unit 32 has a plurality of light-emitting elements 321 and a substrate 322, and the light-emitting elements 321 are disposed on the substrate 322 along the first direction D1. The second direction D2 is a direction from the light input surface S to the light-emitting unit 32. The first direction D1, the second direction D2 and the third direction D3 are perpendicular to each other.

The substrate 322 includes driving circuits, and it can be a flexible substrate, a rigid substrate, or a rigid-flex board. This disclosure is not limited. In this embodiment, the light-emitting elements 321 are light-emitting diodes, which are disposed on the substrate 322 by SMT (Surface Mount Technology). Accordingly, the light-emitting unit 32 is a LED light bar. In this embodiment, one light-emitting unit 32 is disposed adjacent to the light input surface S of the light guiding unit 31. In other embodiments, it is possible to provide another light-emitting unit (not shown) at another light input surface opposite to the light input surface S of the light guiding unit 31. The another light input surface may have the same structural design as the light input surface S. Accordingly, the lights emitted from the two light-emitting units 32 can enter the light guiding unit 31 through the opposite light input surfaces S, respectively. This disclosure is not limited.

Referring to FIG. 1A, the reflective element 34 is disposed on the bottom surface B of the light guiding unit 31 for reflecting the light outputted from the bottom surface B of the light guiding element 31 back to the light guiding element 31 to increase the utility of the light. The reflective element 34 can be a reflective layer (e.g. a metal coating layer) or a reflective plate. In this embodiment, the reflective element 34 is a reflective plate. The reflective element 34 includes a reflective material such as metal, metal oxide, high reflective paint (white paint), or their combinations, and this disclosure is not limited.

The optical film 33 is disposed on the top surface T of the light guiding unit 31. In this embodiment, the backlight module 3 includes three stacked optical films 33 disposed on the top surface T of the light guiding element 31. The optical film 33 is, for example but not limited to, a diffuser, a 90° collector, a 0° collector, a brightness enhancement film, or other optical films. The optical film 33 can transform the light outputted from the top surface T into a uniform surface light source.

As shown in FIGS. 1B and 1C, the light guiding unit 31 includes at least one first protruding portion 311, and the first protruding portion 311 includes a part of the light input surface S. The light input surface S of the light guiding unit 31 includes a connecting surface 312. The connecting surface 312 connects to the first protruding portion 311. The connecting surface 312 can be a planar surface or a curved surface protruding toward the outer side of the light guiding unit 31 (along the second direction D2, from the light input surface S to the light-emitting unit 32). The first protruding portion 311 protrudes along the second direction D2 and extends along the first direction D1. In this embodiment, one first protruding portion 311 protruding along the second direction D2 is configured, and the connecting surface 312 is a curved surface protruding toward the outer side of the light guiding unit 31 (along the second direction D2).

The first protruding portion 311 is connected to the connecting surface 312 to form a turning portion 313, which is disposed between the connecting surface 312 and the first protruding portion 311. In this embodiment, the turning portion 313 is a depressed groove extending along the first direction D1. In addition, the first protruding portion 311 includes a part of the bottom surface B. In other words, the first protruding portion 311 is disposed at the lower side of the light input surface S, and a surface (lower surface) of the first protruding portion 311 is a part of the bottom surface B. In other embodiments, the first protruding portion 311 can be disposed at the upper side of the light input surface S and include a part of the top surface T. This disclosure is not limited.

The first protruding portion 311 is connected to the connecting surface 312 to form the turning portion 313. A shortest distance d1 between the turning portion 313 and the bottom surface B along the third direction D3 is greater than or equal to 0.18 µm and is less than or equal to 100 µm (0.18 µm≤d1≤100 µm). In other embodiments, the shortest distance d1 can be greater than or equal to 1 µm and is less than or equal to 80 µm (1 µm≤d1≤80 µm). In addition, the first protruding portion 311 has a vertex 314, and a shortest distance d2 between the vertex 314 and the turning portion 313 along the second direction D2 is greater than or equal to 0.18 µm and is less than or equal to 30 µm (0.18 µm≤d2≤30 µm). In other embodiments, the shortest distance d2 can be greater than or equal to 1 µm and is less than or equal to 10 µm (1 µm≤d2≤10 µm). As shown in FIG. 1D, a ratio of a maximum protruding distance q of the connecting surface 312 along the second direction D2 to a width w of the light guiding unit 31 along the first direction D1 is greater than 1/500 and less than 1 (1/500<q/w<1). In other embodiments, a ratio of a maximum protruding distance q of the connecting surface 312 along the second direction D2 to a width w of the light guiding unit 31 along the first direction D1 is greater than 1/250 and less than 1/10 (1/250<q/w<1/10).

As shown in FIG. 1B, the light input surface S of the light guiding unit 31 has a first end portion 831 and a second end portion 931 along the first direction D1. In one embodiment, the first protruding portion 311 extends along the first direction D1 from the first end portion 831 to the second end portion 931.

In the display device 1 of this embodiment, the light guiding unit 31 has a first protruding portion 311, which protrudes along the second direction D2 and extends along the first direction D1. Compared with the planar light input surface of the conventional light guiding unit, the light guiding unit 31 of this embodiment has a light input surface with a modified structure for providing a light guiding function. Accordingly, when the light emitted from the light-emitting unit 32 enters the light guiding unit 31, it can be guided to a place farer away from the light-emitting unit 31. This configuration can enhance the luminous efficiency of the backlight module 3 and improve the hotspot issue of the backlight module 3, thereby increasing the display quality of the display device 1.

The light guiding units of different embodiments will be described herein after with reference to FIGS. 2A to 2I. FIGS. 2A to 2I are side views of the light guiding units of different embodiments of the disclosure.

Figure 2A:
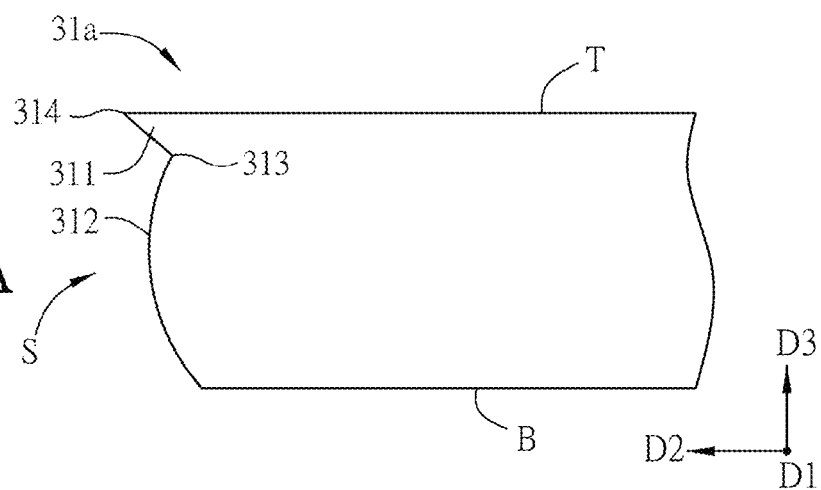
FIGS. 2A to 2I are side views of the light guiding units of different embodiments of the disclosure.

Different from the light guiding unit 31, as shown in FIG. 2A, the first protruding portion 311 of the light guiding unit 31a is disposed at the upper side of the light input surface S, and the top surface of the first protruding portion 311 is a part of the top surface T. In addition, the first protruding portion 311 of the light guiding unit 31a connects to the connecting surface 312 to form a turning portion 313, and a shortest distance d1 (not shown) between the turning portion 313 and the top surface T along the third direction D3 is greater than or equal to 0.18 µm and is less than or equal to 100 µm (0.18 µm≤d1≤100 µm). A shortest distance d2 (not shown) between the vertex 314 of the first protruding portion 311 and the turning portion 313 along the second direction D2 is greater than or equal to 0.18 µm and is less than or equal to 30 µm (0.18 µm≤d2≤30 µm). In another embodiment, the shortest distance d1 can be greater than or equal to 1 µm and is less than or equal to 80 µm (1

µm≤d1≤80 µm), and the shortest distance d2 can be greater than or equal to 1 µm and is less than or equal to 10 µm (1 µm≤d2≤10 µm). To be noted, the turning portion 313 is a point in the sectional view of the light guiding unit 31a as shown in FIG. 2A.

Figure 2B:
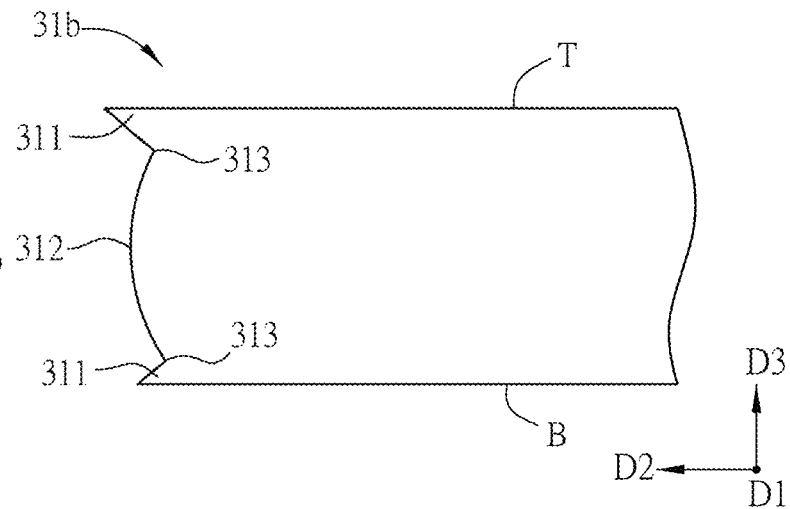

Different from the light guiding unit 31, as shown in FIG. 2B, the light guiding unit 31b has two first protruding portions 311. In this embodiment, the two first protruding portions 311 are connected to two opposite sides (the upper side and the lower side) of the connecting surface 312 to form two turning portions 313. The sizes of the two first protruding portions 311 are different. For example, the size of the first protruding portion 311 at the upper side is larger than the size of the first protruding portion 311 at the lower side.

Figure 2C:
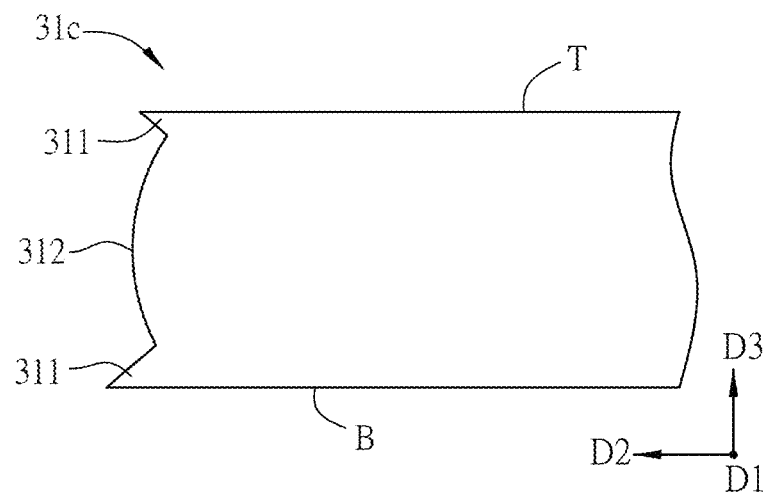

Similar to the light guiding unit 31b, as shown in FIG. 2C, the light guiding unit 31c also has two first protruding portions 311. The difference is that, in the light guiding unit 31c, the size of the first protruding portion 311 at the upper side is smaller than the size of the first protruding portion 311 at the lower side.

Figure 2D:
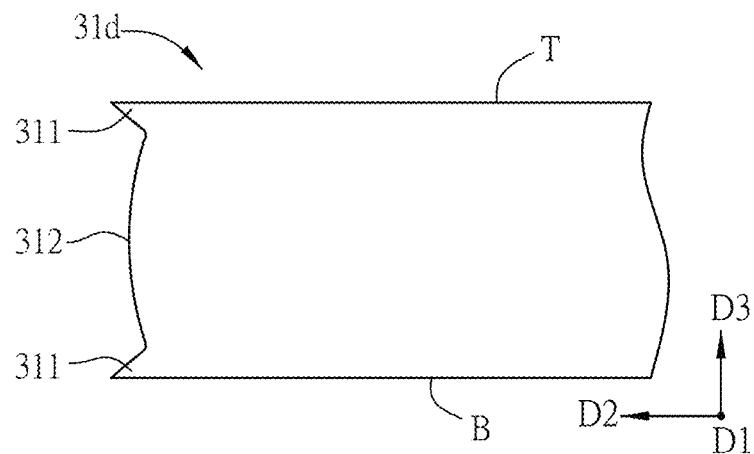

As shown in FIG. 2D, the light guiding unit 31d also has two first protruding portions 311, and the sizes of the two first protruding portions 311 are the same.

Figure 2E:
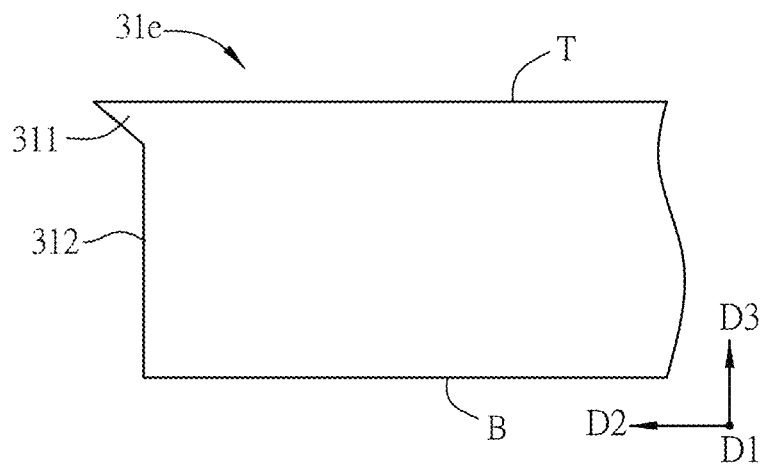

Different from the light guiding unit 31a of FIG. 2A, as shown in FIG. 2E, the connecting surface 312 of the light guiding unit 31e is a planar surface.

Figure 2F:
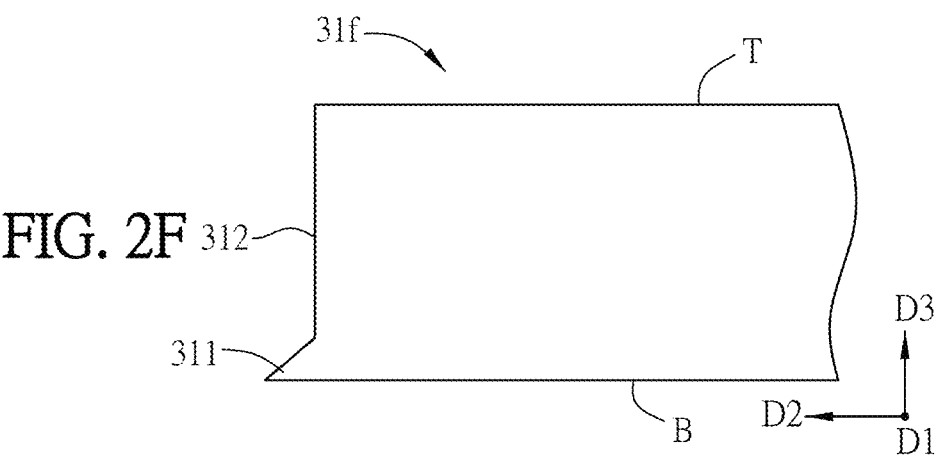

Different from the light guiding unit 31 of FIG. 1C, as shown in FIG. 2F, the connecting surface 312 of the light guiding unit 31f is a planar surface.

Figure 2G:
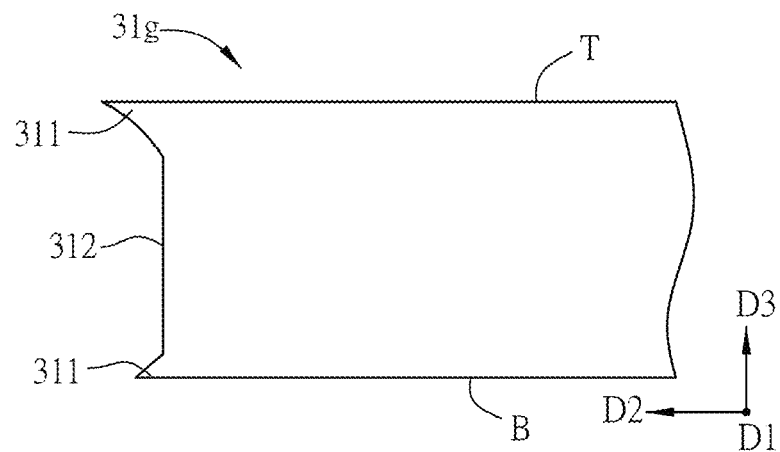

Different from the light guiding unit 31b of FIG. 2B, as shown in FIG. 2G, the connecting surface 312 of the light guiding unit 31g is a planar surface.

Figure 2H:
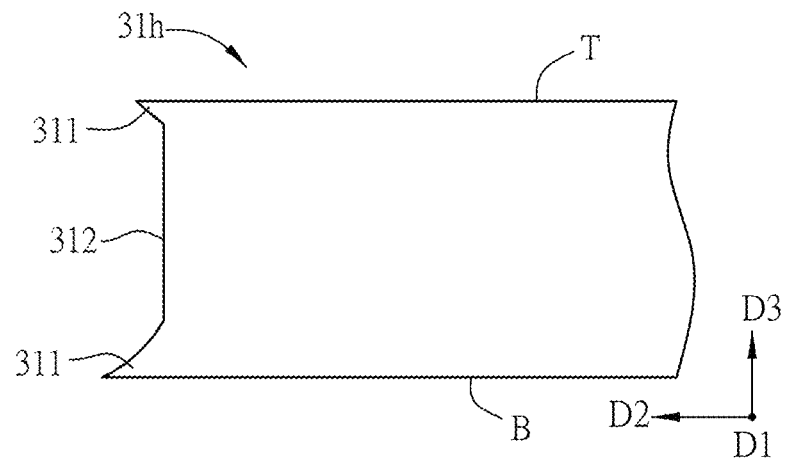

Different from the light guiding unit 31c of FIG. 2C, as shown in FIG. 2H, the connecting surface 312 of the light guiding unit 31h is a planar surface.

Figure 2I:
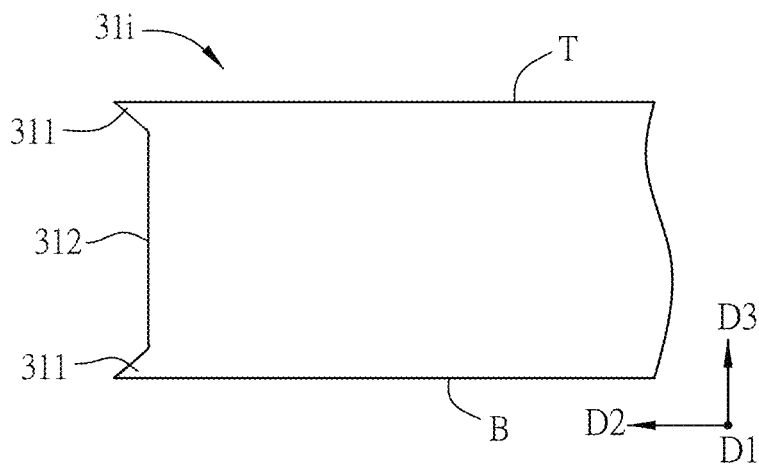

Different from the light guiding unit 31d of FIG. 2D, as shown in FIG. 2I, the connecting surface 312 of the light guiding unit 31i is a planar surface.

The other technical features of the light guiding units 31a-31i can be referred to the above-mentioned light guiding unit 31, so the detailed descriptions thereof will be omitted.

Figure 3:
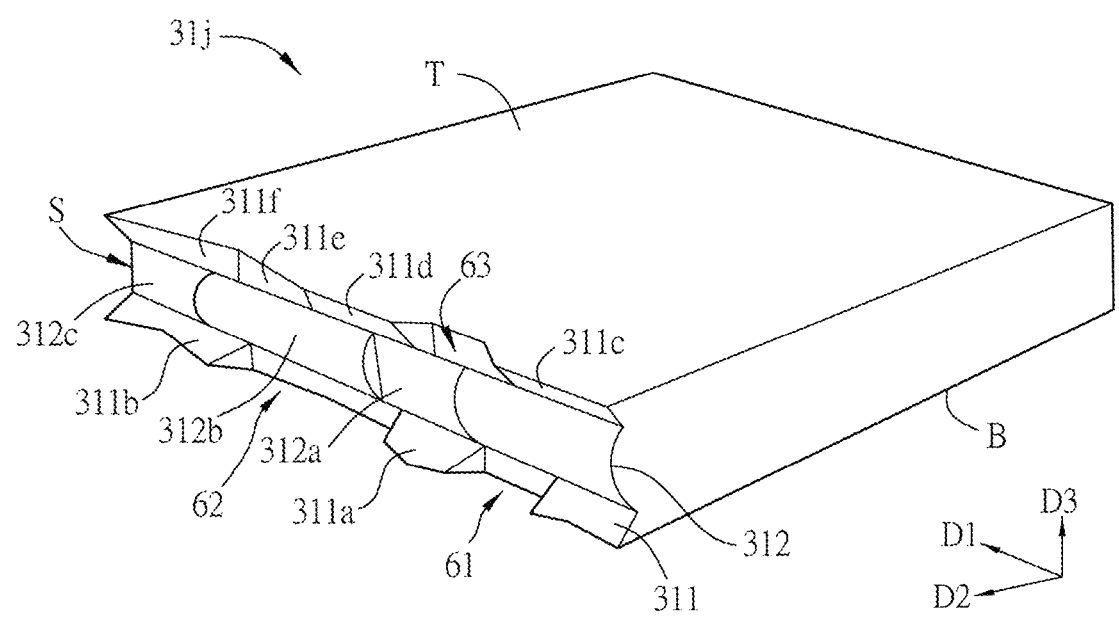
FIG. 3 is a schematic perspective diagram of the light guiding unit according to another embodiment of the disclosure.

FIG. 3 is a schematic perspective diagram of the light guiding unit 31j according to another embodiment of the disclosure.

Referring to FIG. 3, in the light guiding unit 31j, the light guiding unit 31j includes a first protruding portion 311 extending along the first direction and discontinuous first protruding portions 311a and 311b disposed at the lower side of the light input surface S. The light input surface S includes a connecting surface 312 (curved surface). A connecting planar surface or depressed structure 61 is configured between the first protruding portion 311 and the first protruding portion 311a, and a connecting planar surface or depressed structure 62 is configured between the first protruding portion 311a and the first protruding portion 311b. In addition, the light guiding unit 31j further has discontinuous first protruding portions 311c and 311d disposed at the upper side of the light input surface S, a first protruding portion 311e connected to the first protruding portion 311d, and a first protruding portion 311f connected to the first protruding portion 311e. A connecting planar surface or depressed structure 63 is configured between the first protruding portion 311c and the first protruding portion 311d, and the first protruding portions 311e and 311f are tilt planar surfaces. In this embodiment, the light input surface S further includes surfaces 312a, 312b and 312c, which are connected to the connecting surface 312 in order. The surfaces 312 and 312b are curved surfaces protruding toward the outer side of the light guiding unit 31j (the second direction D2), and each of the surfaces 312a and 312c is a planar surface or depressed structure. The above-mentioned depressed structure is a structure with a depression toward the inner side of the light guiding unit 31j (the counter direction of the second direction D2). The first protruding portions 311, 311a, 311b, 311c and 311d are extended along the first direction D1.

Figure 4:
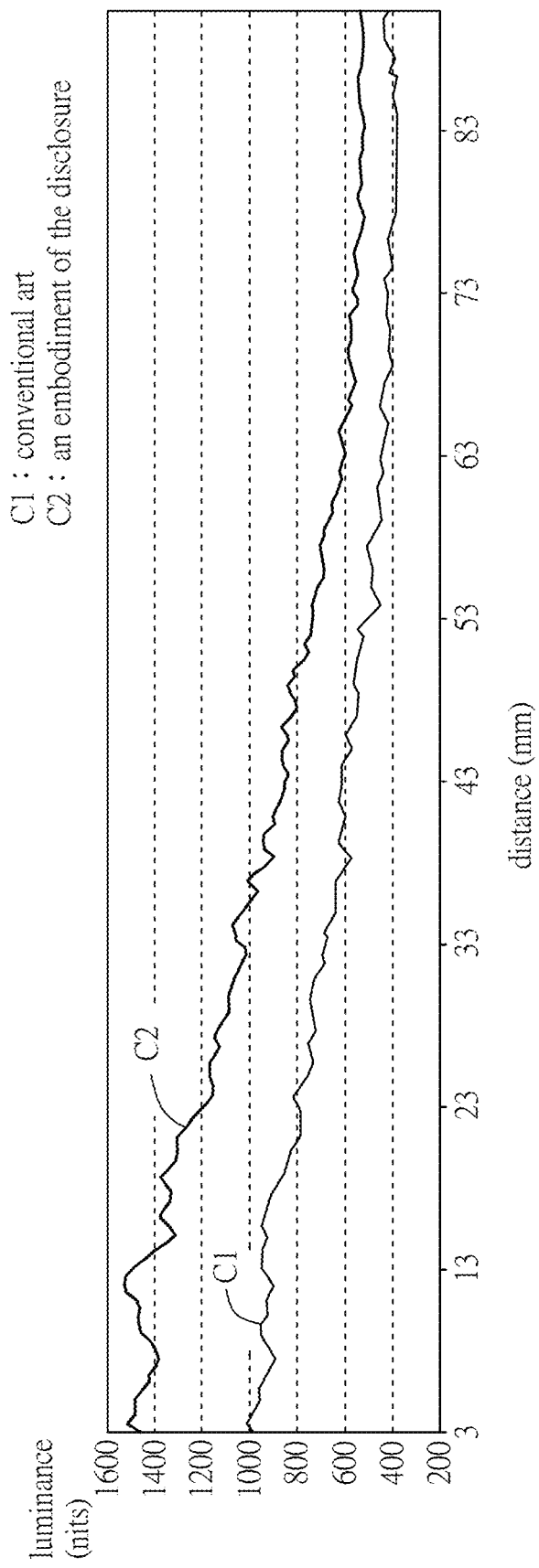
FIG. 4 is a schematic diagram showing the luminance of the conventional light guiding unit and the luminance of the light guiding unit according to an embodiment of the disclosure.

FIG. 4 is a schematic diagram showing the luminance of the conventional light guiding unit and the luminance of the light guiding unit 31d of FIG. 2D. In this embodiment, the light guiding unit 31d has two first protruding portions 311, which have the same size.

Reference to FIG. 4, in the conditions of the same light-emitting unit and the same distance from the light input surface, the luminance of the light guiding unit 31d of an embodiment of the disclosure (curve C2) is obviously higher than the luminance of the conventional light guiding unit (curve C1). As a result, the light input efficiency of the light guiding unit 31d is better than the conventional light guiding unit. Besides, the structure design of the light input surface (side surface) of the light guiding unit 31d can provide a light guiding function, so that the light can be guided to a place farer away from the light input surface. This configuration can further improve the hotspot issue of the backlight module.

Figure 5:
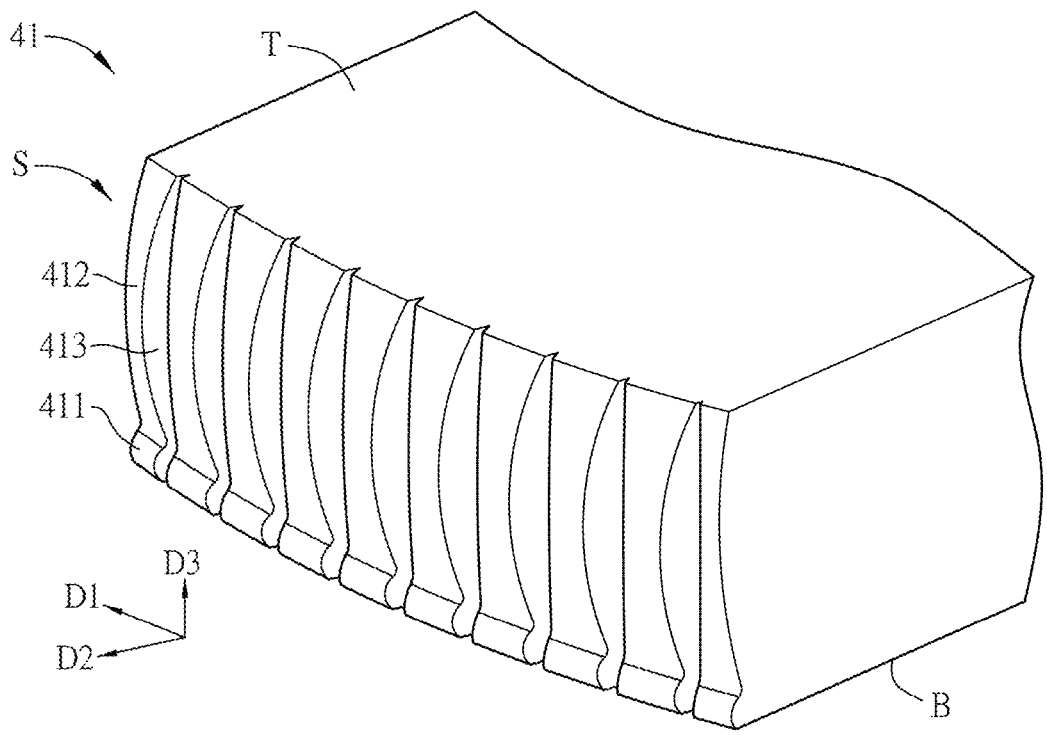
FIG. 5 is a schematic perspective diagram of the light guiding unit according to another embodiment of the disclosure.
Figure 6A:
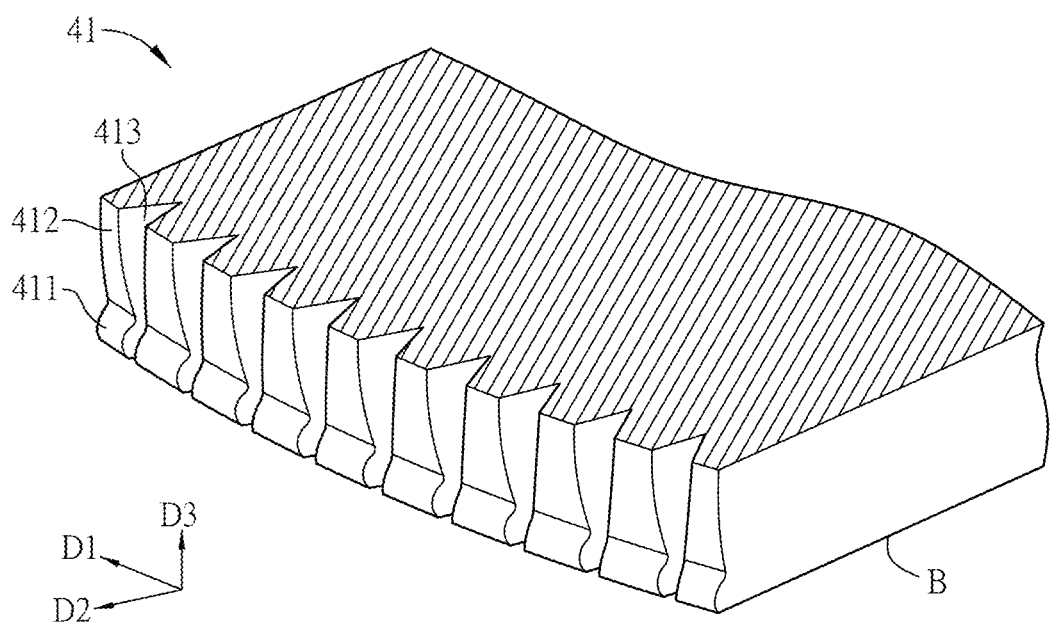
FIG. 6A is a schematic sectional perspective diagram of the light guiding unit of FIG. 5.
Figure 6B:
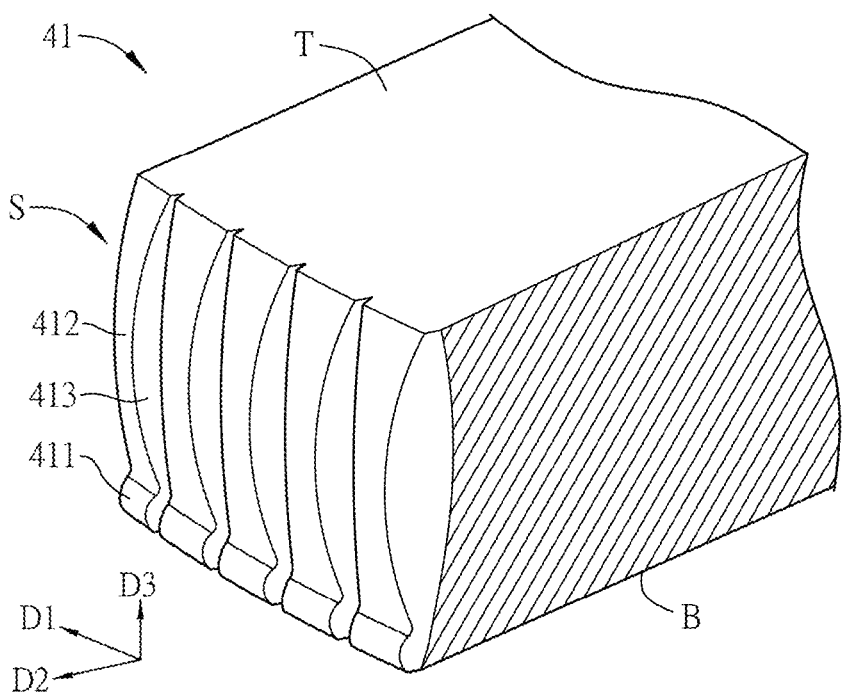
FIGS. 6B and 6C are schematic sectional perspective diagrams of the light guiding unit of FIG. 5 along the third direction.
Figure 6C:
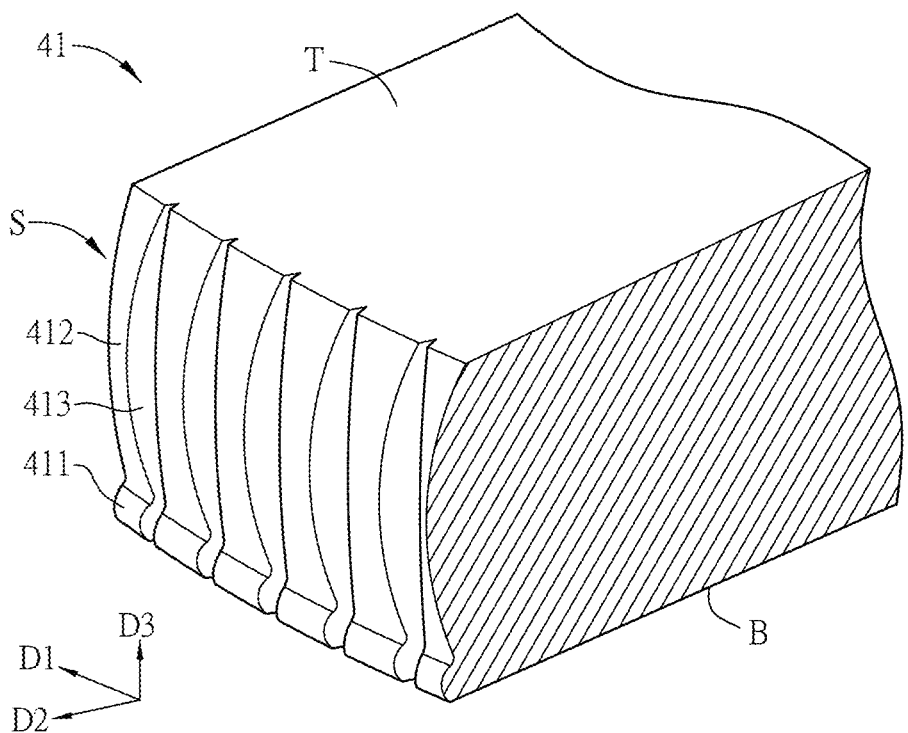

FIG. 5 is a schematic perspective diagram of a light guiding unit 41 according to another embodiment of the disclosure, FIG. 6A is a schematic sectional perspective diagram of the light guiding unit 41 of FIG. 5, FIGS. 6B and 6C are schematic sectional perspective diagrams of the light guiding unit 41 of FIG. 5 along the third direction D3. Herein, FIG. 6B is a schematic sectional perspective diagram of the groove 413 of the light guiding unit 41, and FIG. 6C is a schematic sectional perspective diagram of the second protruding portion 412 of the light guiding unit 41.

Different from the light guiding unit 31 of FIG. 1B, the first protruding portion 411 of the light guiding unit 41 has an arc shape without a vertex. In addition, the light input surface S of the light guiding unit 41 further includes a plurality of grooves 413 extending along the third direction D3. The grooves 413 is also named as microstructures, and the number of the grooves 413 is not limited. The grooves 413 can be arrange in parallel, and each of the grooves 413 has an arc shape. The grooves 413 are depressed to a counter direction of the second direction D2 and extend along the third direction D3. As shown in FIG. 6B, the arc shape means that the bottom of the groove 413 has an arc shape depressed to the inner part of the light guiding unit 41. In some embodiments, the curvature radius of the arc-shaped grooves 413 is between 500 mm and a half of the thickness of the light guiding unit 41 along the third direction D3.

As shown in FIG. 5, the light guiding unit 41 includes a plurality of first protruding portions 411, which are protruded toward the second direction D2 and extended along the first direction D1. Herein, the extending first protruding portions 411 are separated by the grooves 413, which are also extended along the third direction D3.

As shown in FIG. 6C, a second protruding portion 4712 is formed between two adjacent grooves 413. To be noted, there are a plurality of second protruding portions 412. Each of the second protruding portions 412 has an arc surface protruding toward the outer side of the light guiding unit 41 (the second direction D2). In some embodiments, the curvature radius of the arc surface of the second protruding portion 412 is between 500 mm and a half of the thickness of the light guiding unit 41 along the third direction D3. The other technical features of the light guiding unit 41 can be referred to the light guiding unit 31, so the detailed descriptions thereof will be omitted.

Figure 7:
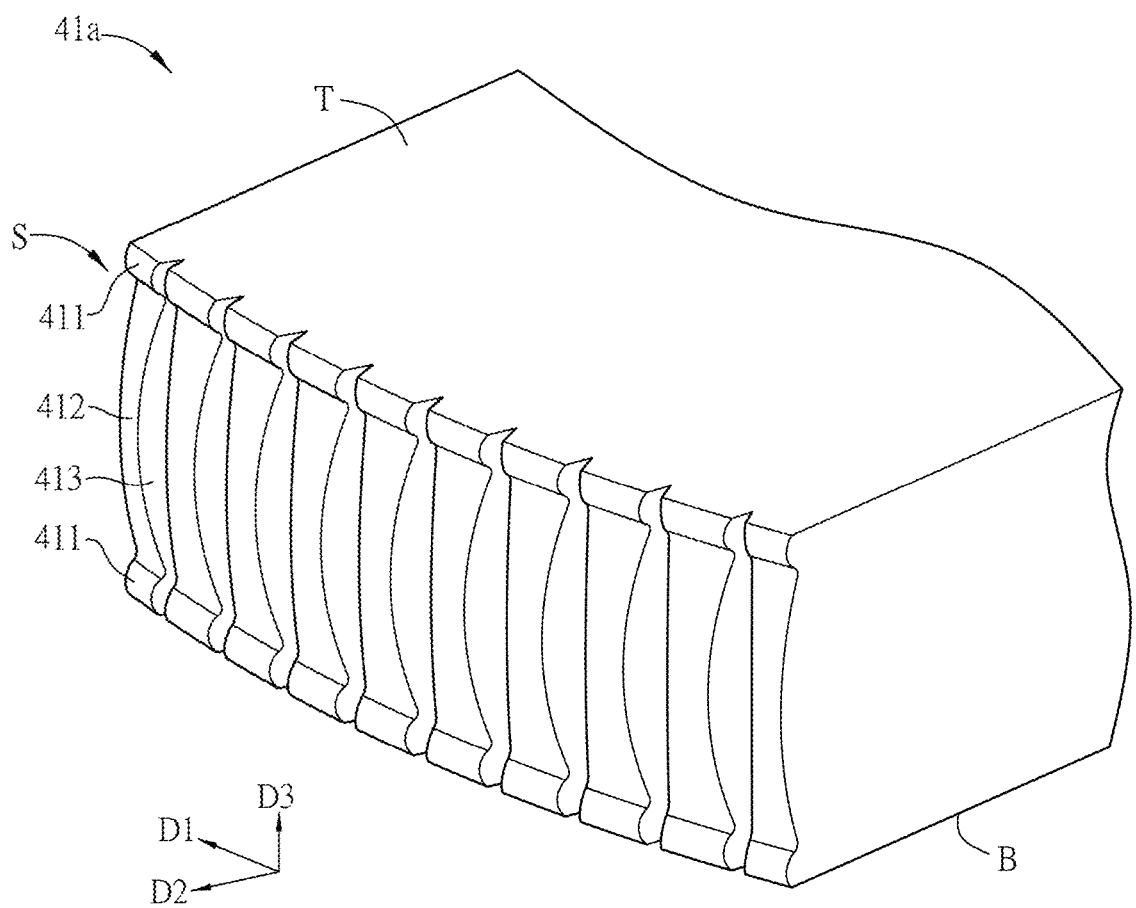
FIG. 7 is a schematic perspective diagram of the light guiding unit according to another embodiment of the disclosure.
Figure 8A:
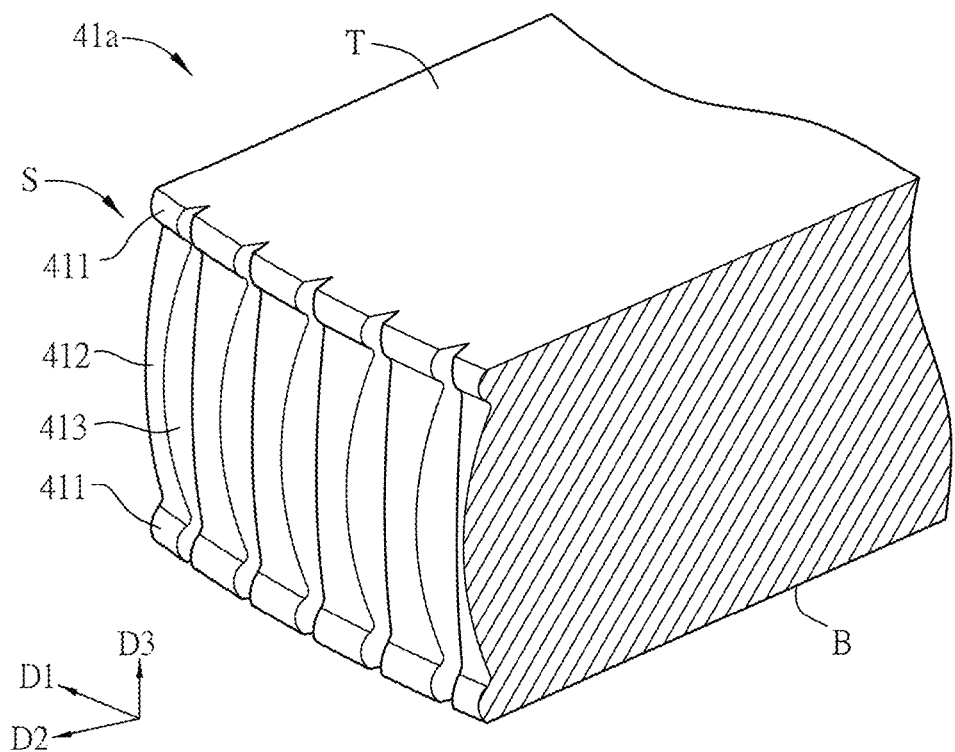
FIGS. 8A and 8C are schematic sectional perspective diagrams of the light guiding unit of FIG. 7 along the third direction.
Figure 8B:
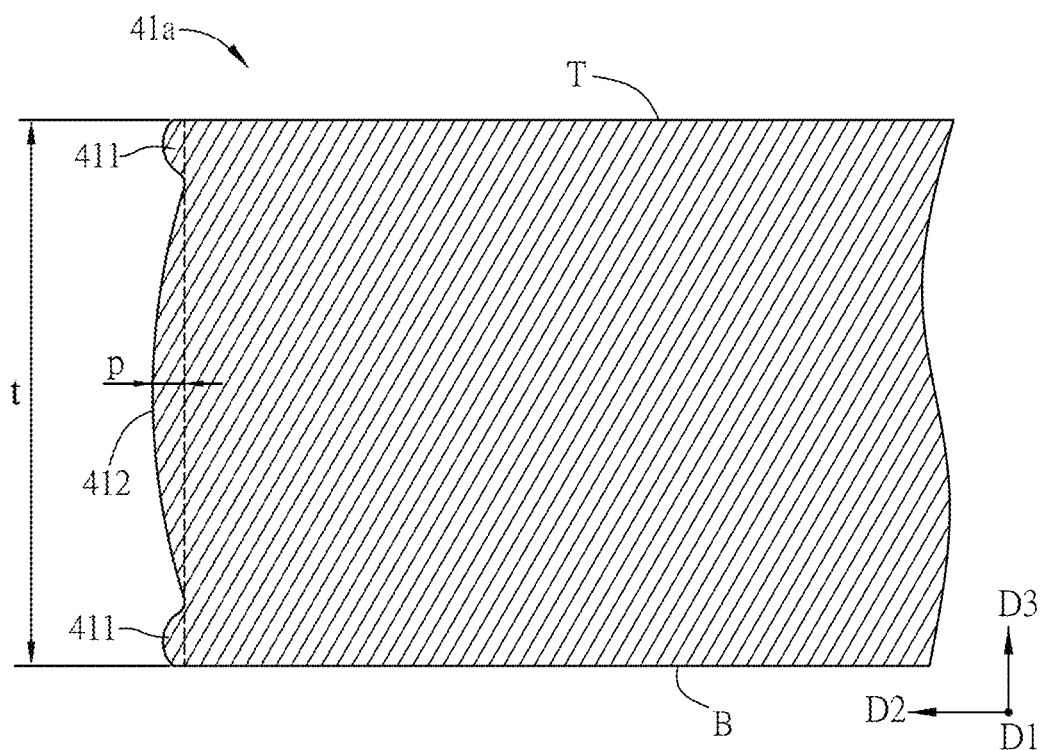
FIGS. 8B and 8D are side views of FIGS. 8A and 8C, respectively.
Figure 8C:
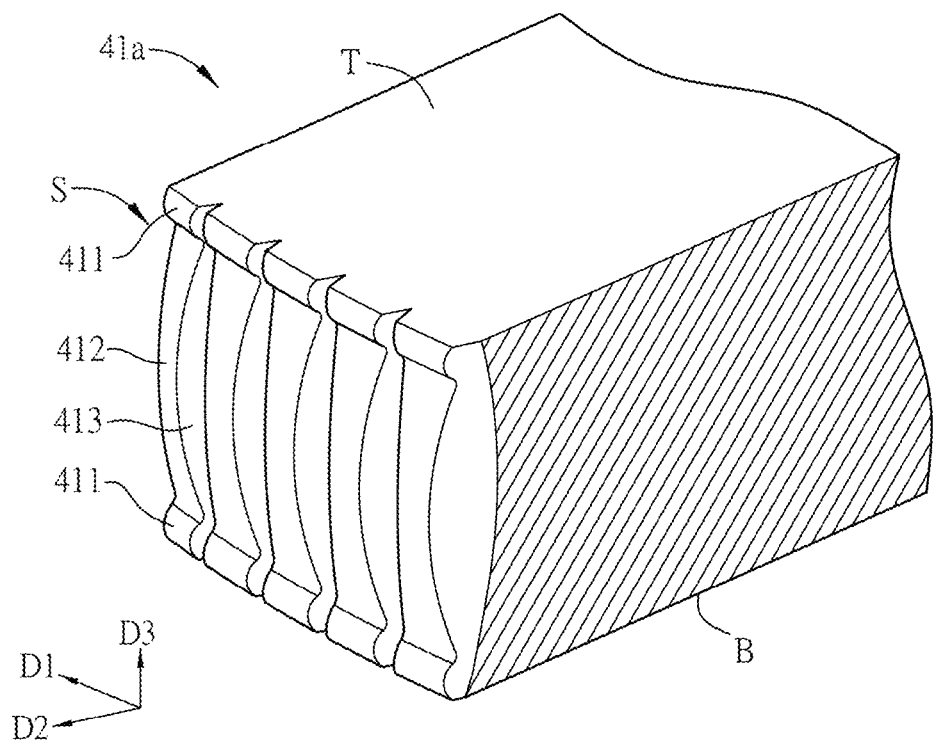
Figure 8D:
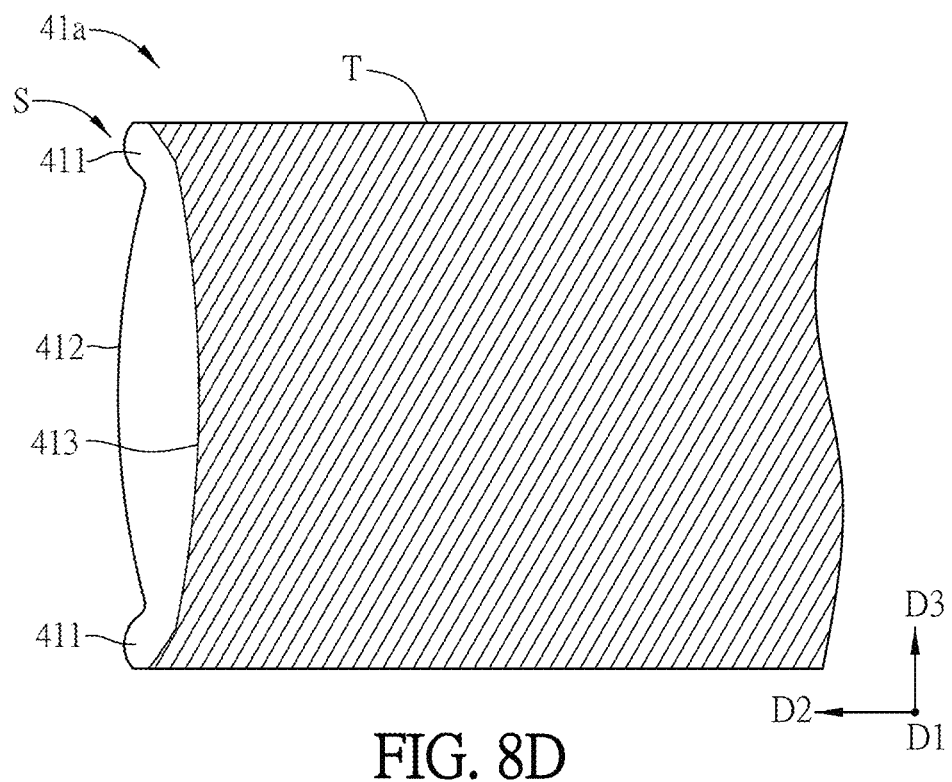
Figure 9A:
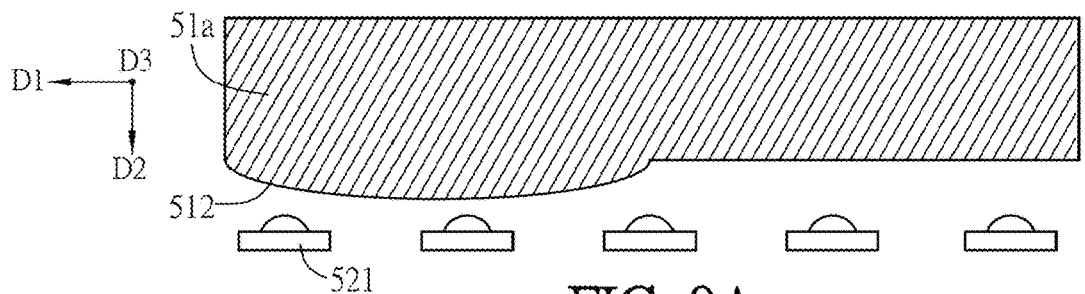
FIGS. 9A to 9J are sectional views of the light guiding units of different embodiments of the disclosure.
Figure 9B:
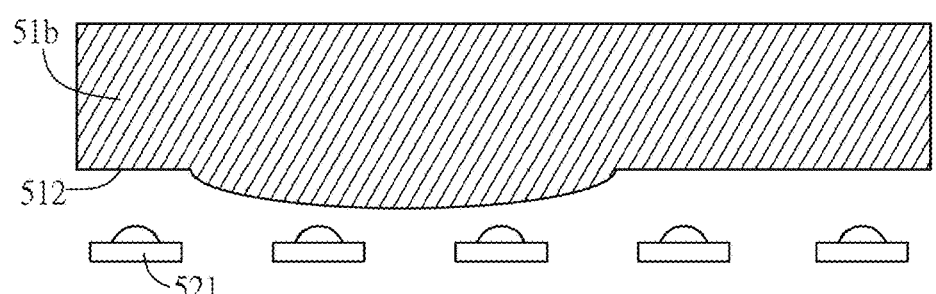
Figure 9C:
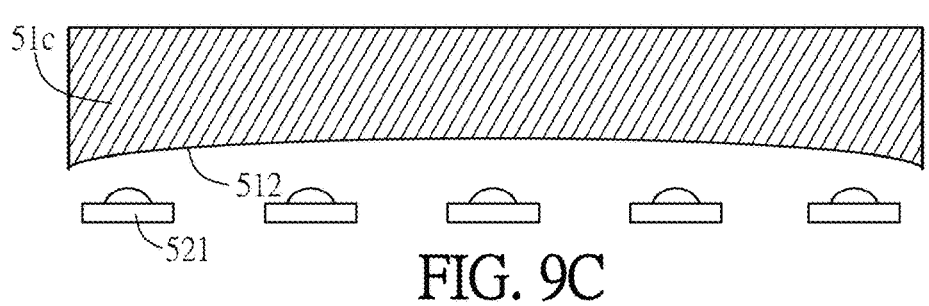
Figure 9D:
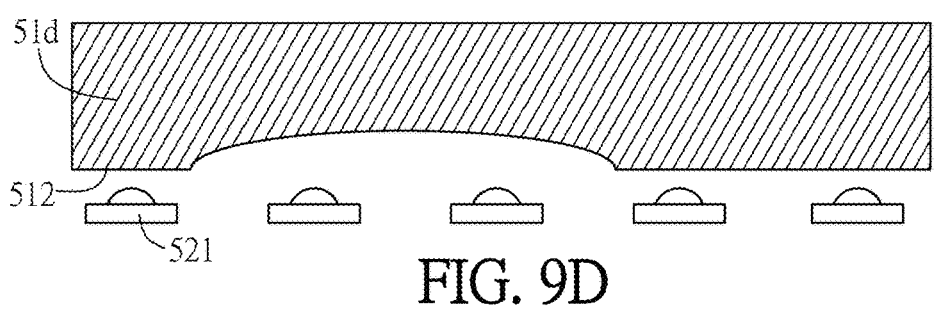
Figure 9E:
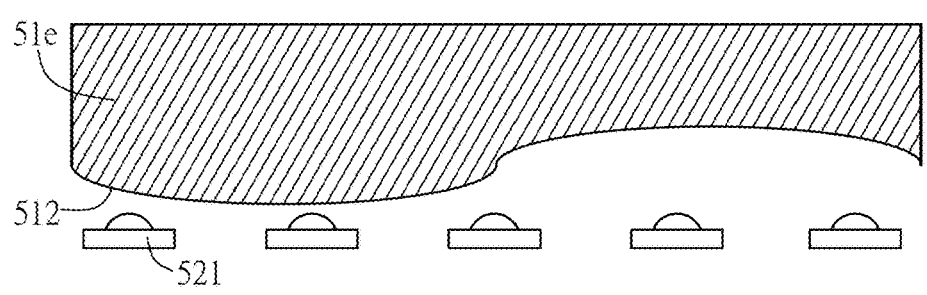
Figure 9F:
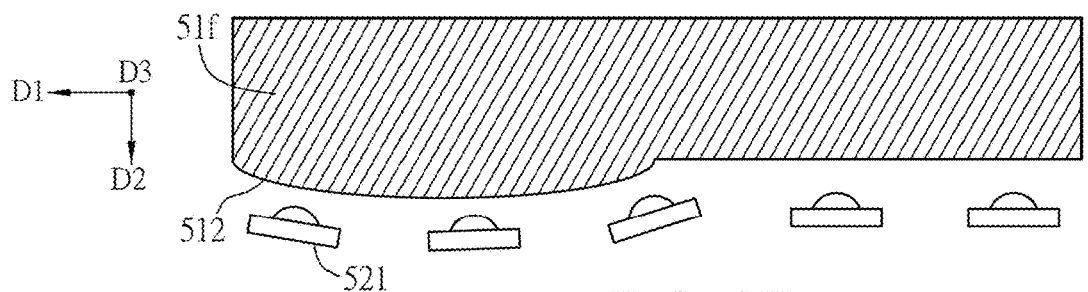
Figure 9G:
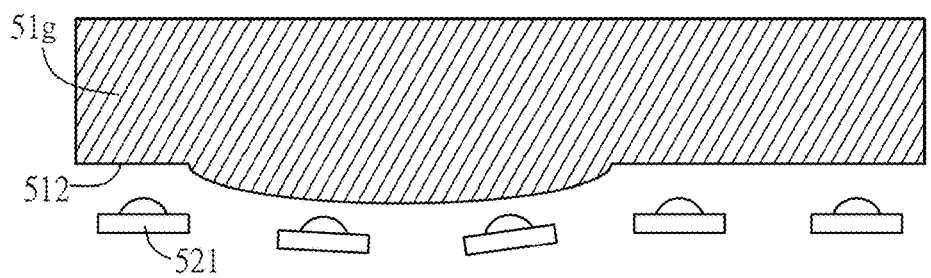
Figure 9H:
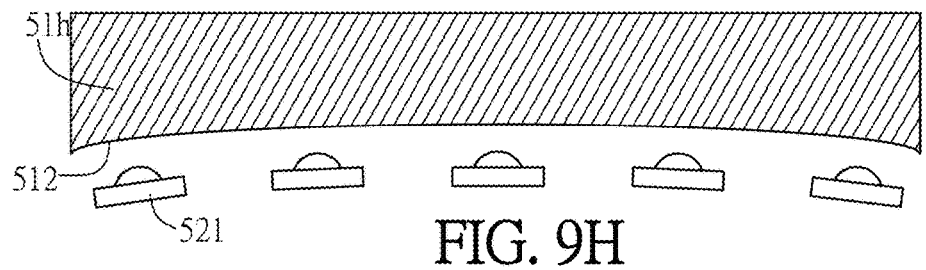
Figure 9I:
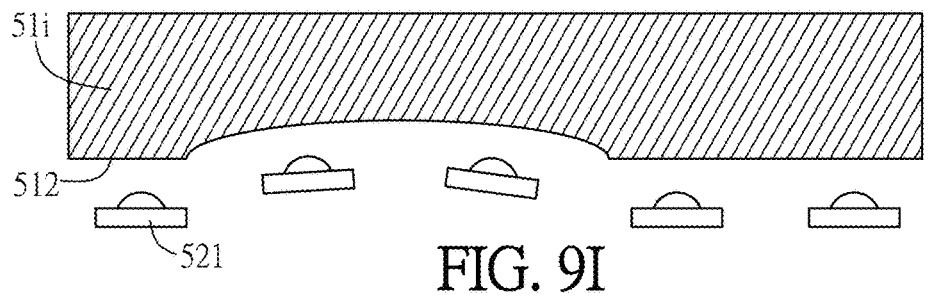
Figure 9J:
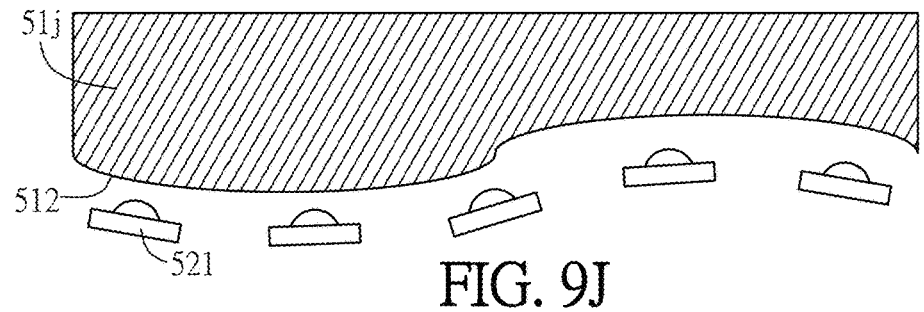

FIG. 7 is a schematic perspective diagram of the light guiding unit 41a according to another embodiment of the disclosure, FIGS. 8A and 8C are schematic sectional perspective diagrams of the light guiding unit 41a of FIG. 7 along the third direction D3, and FIGS. 8B and 8D are side views of FIGS. 8A and 8C, respectively. Herein, FIG. 8A is a schematic sectional perspective diagram of the second protruding portion 412 of the light guiding unit 41a, and FIG. 8C is a schematic sectional perspective diagram of the groove 413 of the light guiding unit 41a.

Different from the light guiding unit 41 of FIG. 5, the light guiding unit 41a includes two first protruding portions 411, which are disposed at two opposite sides of the light input surface S. Each of the two first protruding portions 411 has an arc shape without a vertex. As shown in FIG. 8B, in the light guiding unit 41a, a ratio of a maximum protruding distance p of the second protruding portion 412, which is disposed between two grooves 413, along the second direction D2 to a thickness t of the light guiding unit 41a along the third direction D3 is greater than 1/500 and less than 1/10 (1/500<p/t<1/10). In another embodiment, a ratio of a maximum protruding distance p of the second protruding portion 412 along the second direction D2 to a thickness t of the light guiding unit 41a along the third direction D3 is greater than 1/250 and less than 1/10 (1/250<p/t<1/10).

The other technical features of the light guiding units 41a can be referred to the above-mentioned light guiding unit 41, so the detailed descriptions thereof will be omitted.

Accordingly, the modified structure of the light input surface S of the light guiding unit 41 or 41a (including the first protruding portion 411, the second protruding portion 412 and the groove 413) can provide a light converging function, so that the light can be guided to a place farer away from the light input surface. This configuration can further improve the hotspot issue of the backlight module.

FIGS. 9A to 9J are sectional views of the light guiding units 51a-51j of different embodiments of the disclosure. The FIGS. 9A to 9J are sectional views of the surface 512 of the side surface (light input surface) of the light guiding units 51a-51j, and parts of the light guiding units 51a-51j and the relative positions of the light guiding units 51a-51j and the light-emitting elements 521 are shown in the figures.

The flat display device generally has a rectangular shape. When applying to a non-rectangular display device, the shape of the light guiding unit (as well as the light-emitting unit) must be changed based on the shape of the non-rectangular display panel. As shown in FIGS. 9A to 9I, the shapes of the shapes of the light guiding units 51a-51j are changed based on the shapes of the non-rectangular display panels, and the configurations of the light-emitting elements 521 are also changed based on the shapes of the light input surfaces of the light guiding units 51a-51j. For example, as shown in FIGS. 9A to 9J, the light input surfaces 512 of the light guiding units 51a-51j are not planar surfaces but have a protruding shape, a depression shape, or a combination of protrusion and depression. As shown in FIGS. 9A to 9E, the light-emitting elements 521 are arranged along the first direction D1 and are not modified based on the shape of the light input surface of the light guiding unit. As shown in FIGS. 9F to 9J, the positions of the light-emitting elements 521 are modified based on the shape of the light input surface 512 of the light guiding unit. To be noted, the structural designs and modifies of the light input surfaces of the light guiding units of the above-mentioned embodiments can also be applied to the non-rectangular display device by the method of FIGS. 9A to 9J.

Accordingly, the structural design of the above light guiding units can improve the hotspot issue of the backlight module. In other embodiments, the light input surface of the light guiding unit can have additional structural designs for obtaining the same effect to improve the hotspot issue. For example, the light input surface can be divided into two regions, and the surface roughnesses of the regions are different. This design can also improve the hotspot issue of the backlight module.

Figure 10A:
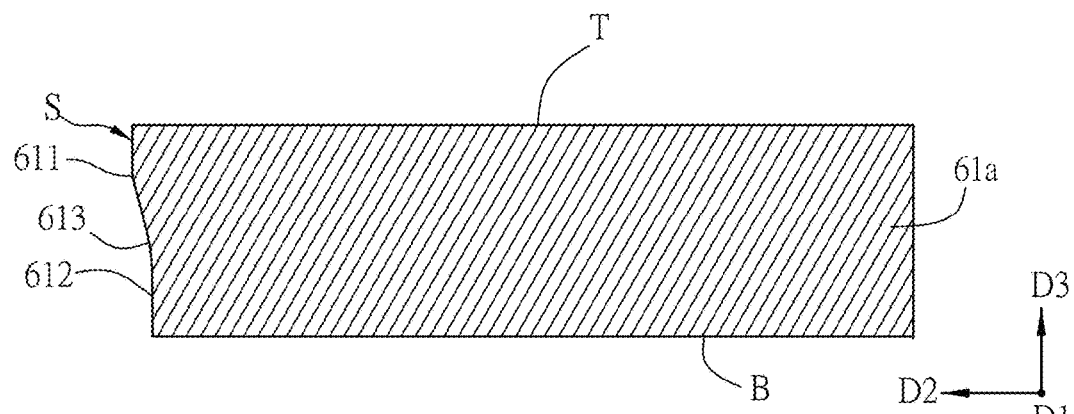
FIGS. 10A to 10C are side views of the light guiding units of different embodiments of the disclosure.
Figure 10B:
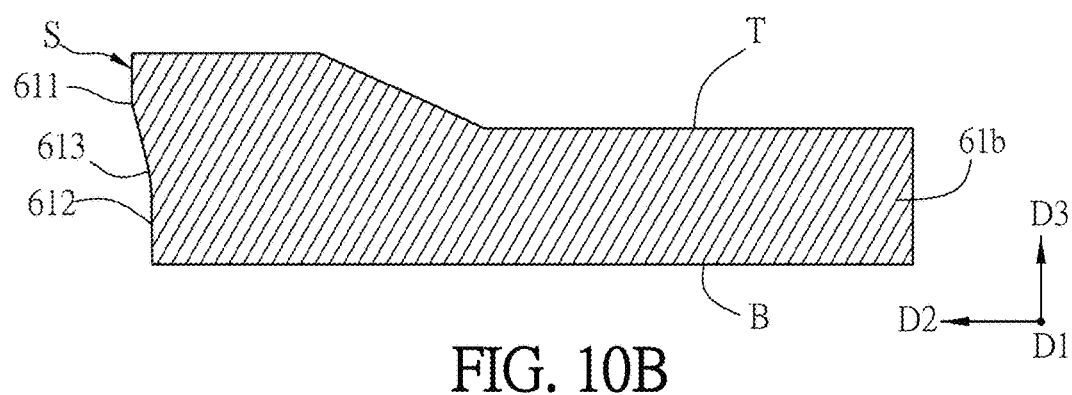
Figure 10C:
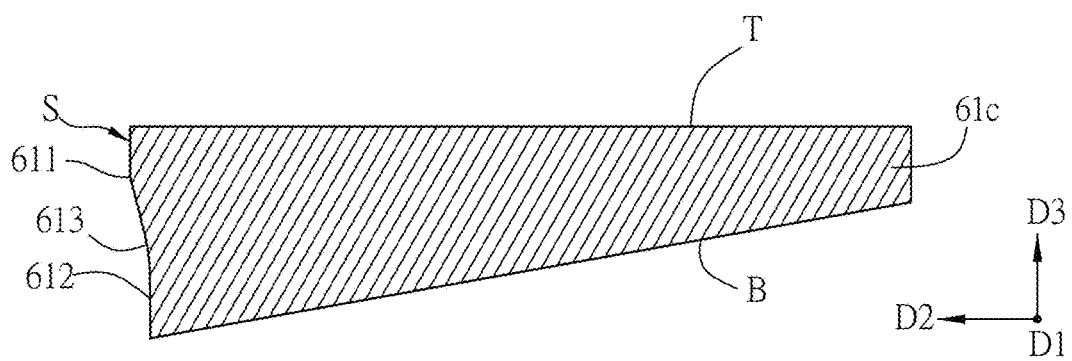

FIGS. 10A to 10C are side views of the light guiding units 61a-61c of different embodiments of the disclosure.

As shown in FIG. 10A, the light guiding unit 61a of this embodiment is a planar light guiding plate. The light guiding unit 61a includes a first protruding portion 611, and the light input surface S includes a connecting surface 612. The connecting surface 612 is a planar surface, and the first protruding portion 611 is protruded along the second direction D2 and extended along the first direction D1. The connecting surface 612 connects to the first protruding portion 611 to form a turning portion 613, which is disposed between the connecting surface 612 and the first protruding portion 611. In this embodiment, the turning portion 613 is a smooth bent structure connecting the connecting surface 612 and the first protruding portion 611 extending along the first direction D1 instead of a depressed groove. In addition, the first protruding portion 611 connects to the top surface T. In other words, the first protruding portion 611 is located at the upper side of the light input surface S, and the connecting surface 612 is located at the lower side of the light input surface S and connected to the bottom surface B. This disclosure is not limited. In some embodiments, the first protruding portion 611 is located at the lower side of the light input surface S and connected to the bottom surface B, and the connecting surface 612 is located at the upper side of the light input surface S and connected to the top surface T.

As shown in FIG. 10B, the light guiding unit 61b is a flat plate with a horn shape. In other words, the part of the light guiding unit 61b close to the light input surface S has a larger thickness, and the thickness of the light guiding unit 61b is getting smaller as departing from the light input surface S. The part of the light guiding unit 61b beyond a certain distance from the light input surface S has a constant thickness. In addition, as shown in FIG. 10C, the light guiding unit 61b is a wedge plate. The other technical features of the light guiding units 61a, 61b and 61c can be referred to the above-mentioned light guiding unit 31, so the detailed descriptions thereof will be omitted.

Figure 11A:
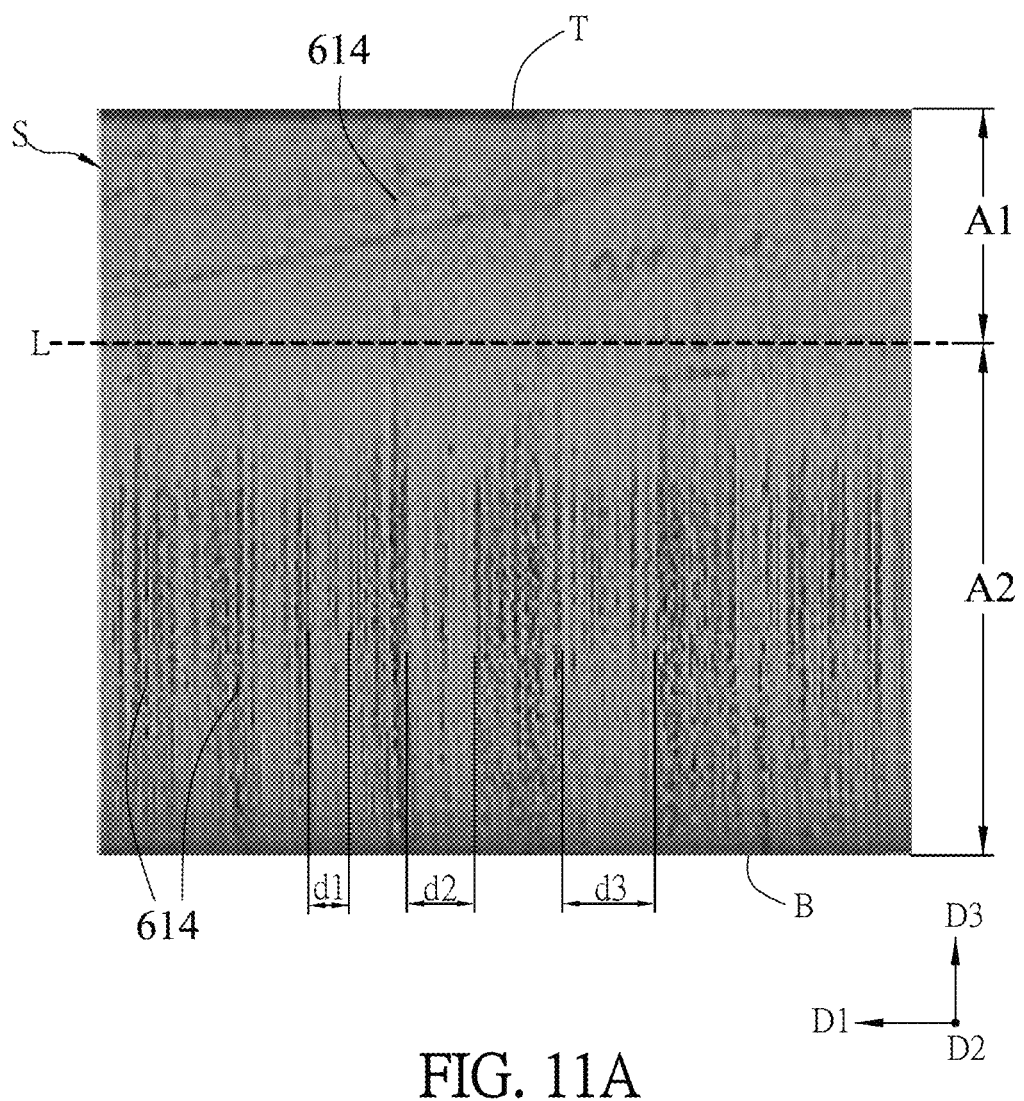
FIG. 11A is a front view of the light input surface of the light guiding unit according to an embodiment.

FIG. 11A is a front view of the light input surface of the light guiding unit according to an embodiment. In this embodiment, FIG. 11A can be a front view of the light input surface S of any of the above-mentioned light guiding units 61a, 61b and 61c (viewing from a direction parallel to the second direction D2).

In this embodiment, the light input surface S includes two regions, including a first region A1 and a second region A2 having different surface roughnesses. The first region A1 is connected to the top surface T, and the second region A2 is connected to the bottom surface B. The surface roughness of the first region A1 is smaller than the roughness of the second region A2. In some embodiments, the surface roughness can be an average roughness of a linear line. The average roughness of a linear line within the first region A1 is 0-3 μm, and the average roughness of a linear line within the second region A2 is 1-10 μm. In some embodiments, the surface roughness can be a maximum roughness. The maximum roughness of the first region A1 is 0.5-5 μm, and the maximum roughness of the second region A2 is 1.520 μm. In some embodiments, the surface roughness can be an average roughness of ten points. The average roughness of ten points within the first region A1 is 0-4 μm, and the average roughness of ten points within the second region A2 is 0.525 μm.

The first region A1 or the second region A2 may include a plurality of microstructures 614. The microstructures 614 can be bar structures extending along the third direction D3, so that the first region A1 and the second region A2 can have different roughnesses. In addition, the microstructures 614 of the first region A1 or the second region A2 may have different pitches. In other words, taking the microstructures 614 of the second region A2 as an example, as shown in FIG. 11A, the pitch d1, the pitch d2, and the pitch d3 of the adjacent microstructures 614 are different (d14243). In other embodiments, two or three of the pitch d1, the pitch d2 and the pitch d3 are the same, and this disclosure is not limited.

Figure 11B:
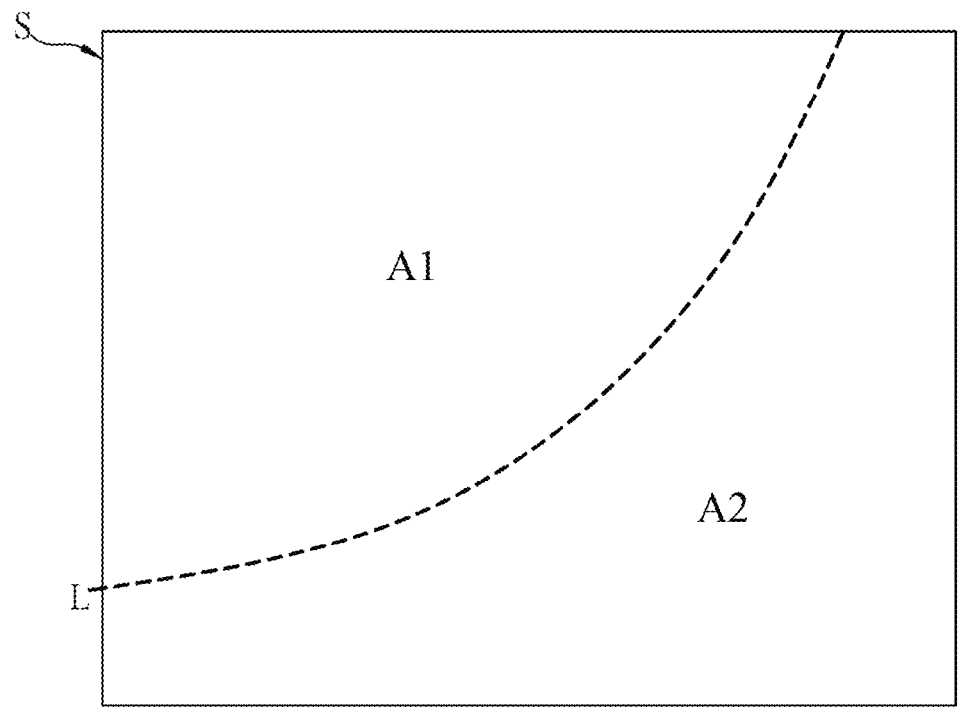
FIGS. 11B to 11E are schematic diagrams showing the light input surfaces of the light guiding units of different embodiments.
Figure 11C:
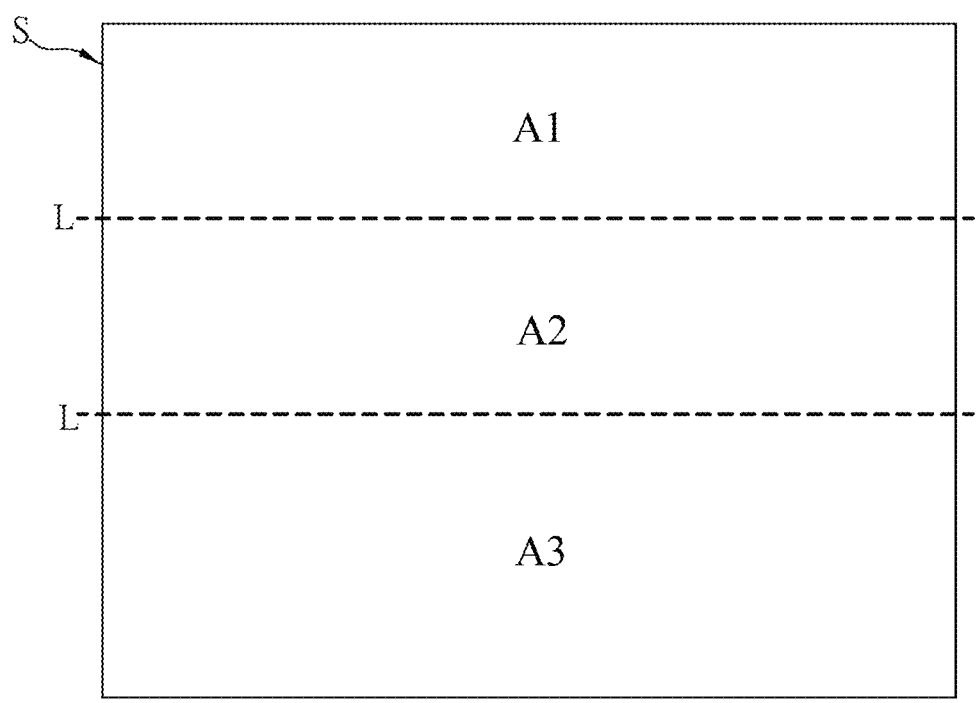
Figure 11D:
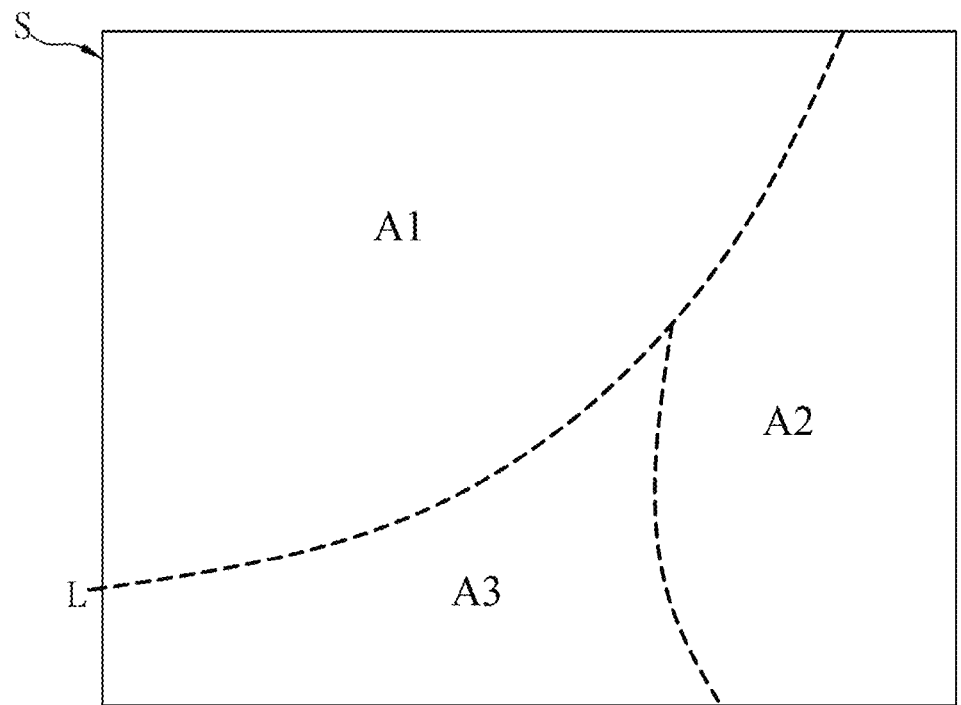
Figure 11E:
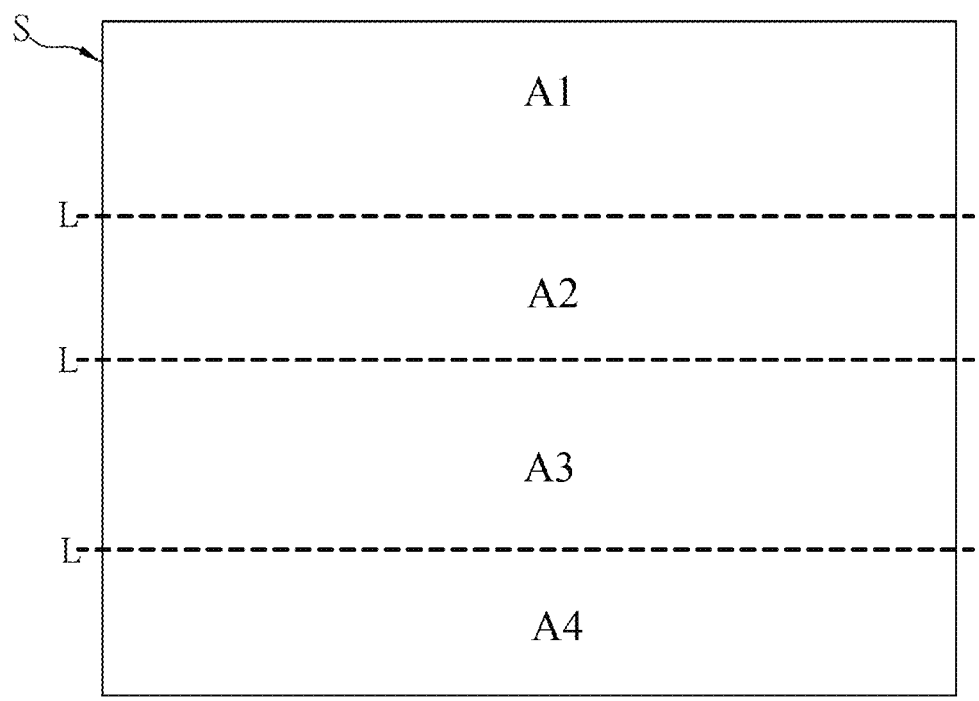

In the embodiment of FIG. 11A, the light input surface S is divided into two regions A1 and A2 by a virtual line L (dotted line). In another embodiment as shown in FIG. 11B, the virtual line is a curved line. In another embodiment as shown in FIG. 11C, the light input surface S is divided into three regions A1, A2 and A3 by two virtual lines L (dotted line). In another embodiment as shown in FIG. 11D, the light input surface S is divided into three regions A1, A2 and A3 by two virtual curved lines L. In another embodiment as shown in FIG. 11E, the light input surface S is divided into four regions A1, A2, A3 and A4 by three virtual lines L. To be noted, the light input surface S can be divided into multiple regions by linear lines, curved lines or a combination of linear and curved lines, and this disclosure is not limited. The aspect having any two of the divided regions of the light input surface S with different surface roughnesses will fall in the scope of the disclosure.

Figure 12:
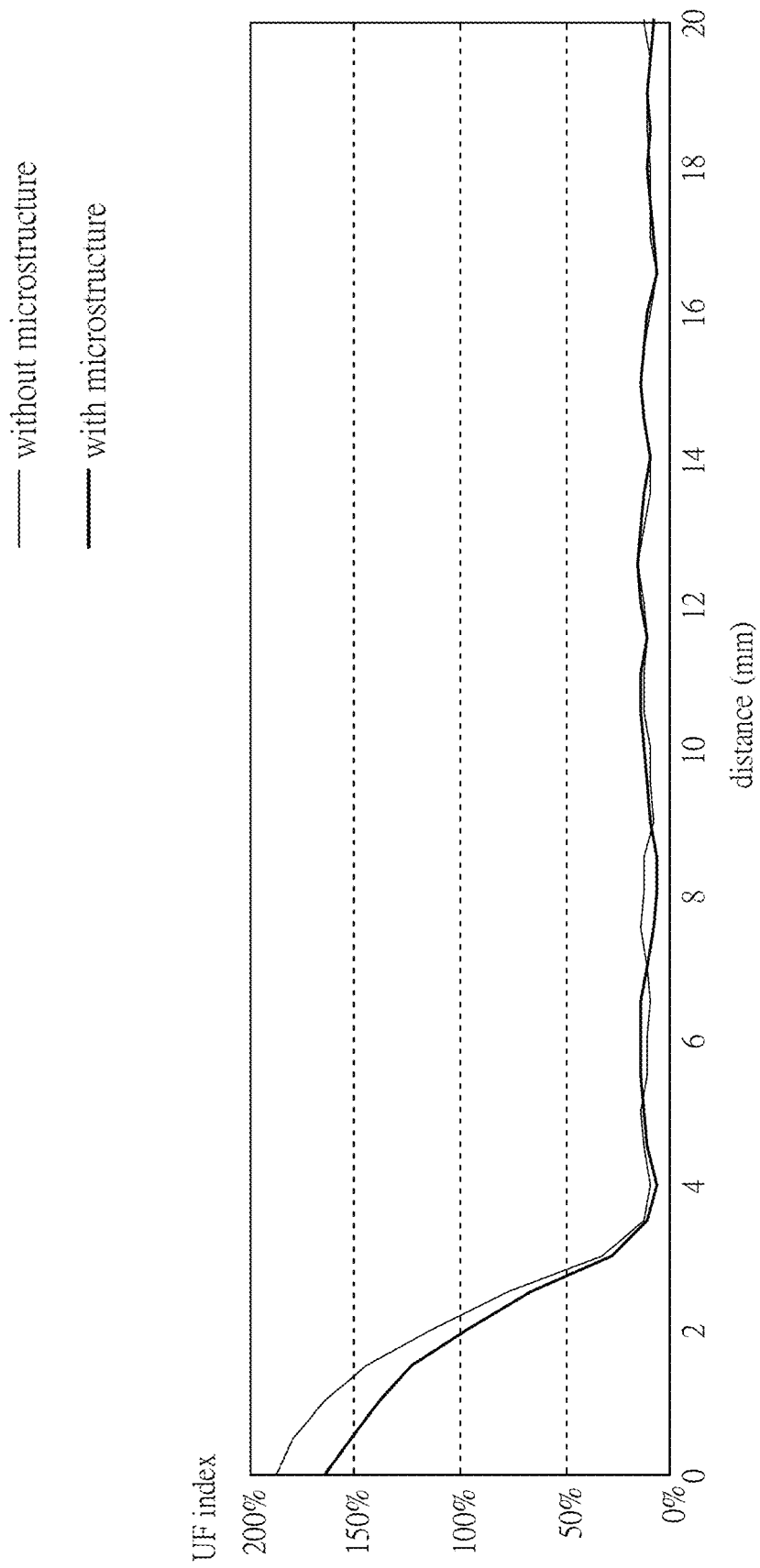
FIG. 12 is a schematic diagram showing the light intensities as the light input surface of the light guiding unit is configured with or without the microstructures.

FIG. 12 is a schematic diagram showing the light intensities as the light input surface of the light guiding unit is configured with or without the microstructures. Herein, the vertical coordinate is the UF index, and the horizontal coordinate is the distance from the light input surface. The UF index is the brightest light intensity minus the darkest light intensity and then divided by the darkest light intensity (%). The lower UF index means the slighter hotspot issue.

As shown in FIG. 12, in the conditions of the same light-emitting unit and the same distance from the light input surface (e.g. 5 mm), the UF index of the light guiding unit having a light input surface with microstructures is obviously lower than the UF index of the light guiding unit having a light input surface without microstructures. Accordingly, this result proves that the microstructure design can help to improve the hotspot issue of the light guiding unit.

To be noted, the design of dividing the light input surface of the light guiding unit into at least two regions having different surface roughnesses can be applied to any of the above-mentioned light guiding units 31, 31a-31j, 41, 41a, and 51a-51j. In addition, the structural design with rough surface can also be applied to the edges of the optical films, so that the side walls of the optical films can have rough surfaces. This configuration can improve the light leakage issue of the display device. In other words, the optical films with peripheral microstructure design can minimize the edge bright line of the display device.

As mentioned above, in the display device of some embodiments of the disclosure, the light guiding unit of the backlight module has at least one first protruding portion, which protrudes toward the second direction and extends along the first direction, or has at least two regions with different roughnesses. Compared with the conventional light guiding unit, which has a planar light input surface, the light guiding unit of the embodiments of the disclosure has a light input surface with a modified structure for providing a light guiding function. Accordingly, when the light emitted from the light-emitting unit enters the light guiding unit, it can be guided to a place farer away from the light-emitting unit. This configuration can enhance the luminous efficiency of the backlight module and improve the hotspot issue of the backlight module, thereby increasing the display quality of the display device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display device, comprising:
    a display panel; and
    a backlight module disposed corresponding to the display panel and comprising a light-emitting unit and a light guiding unit, wherein the light guiding unit has a light input surface, a bottom surface and a top surface, the light input surface connects the bottom surface and the top surface, the light-emitting unit has a plurality of light-emitting elements, the light-emitting elements are disposed along a first direction and adjacent to the light input surface, a second direction is a direction from the light input surface to the light-emitting unit, and a third direction is perpendicular to the first direction and the second direction;
    wherein, the light guiding unit comprises a first protruding portion at the bottom surface, the first protruding portion comprises a sharp protrusion tip at the bottom surface and a part of the light input surface, the light input surface comprises a curved convex connecting surface, the curved convex connecting surface connects to the first protruding portion to form a turning portion, and the turning portion is disposed between the curved convex connecting surface and the first protruding portion;
    wherein, the curved convex connecting surface is at an intermediate portion of the light input surface and outwardly protrudes toward the light-emitting elements along the second direction, and the light-emitting elements are across from the curved convex connecting surface and generally positioned above the first protruding portion in the third direction;
    wherein the light guiding unit further comprises an additional protruding portion at the top surface, the light-emitting elements are generally positioned below the additional protruding portion in the third direction, and the first protruding portion and the additional protruding portion connect to two opposite sides of the curved convex connecting surface to respectively form the turning portion and an additional turning portion;
    wherein the first protruding portion and the additional protruding portion have different dimensions along the second direction.

2. The display device of claim 1, wherein the first protruding portion comprises a part of the bottom surface.

3. The display device of claim 2, wherein a shortest distance between the turning portion and the bottom surface along the third direction is greater than or equal to 0.18 μm and is less than or equal to 100 μm.

4. The display device of claim 1, wherein the sharp protrusion tip of the first protruding portion has a vertex, and a shortest distance between the vertex and the turning portion along the second direction is greater than or equal to 0.18 μm and is less than or equal to 30 μm.

5. The display device of claim 1, wherein the curved convex connecting surface is curved in the first direction and the third direction.

6. The display device of claim 5, wherein when viewing along the third direction, a ratio of a maximum protruding distance of the curved convex connecting surface along the second direction to a width of the light guiding unit along the first direction is greater than 1/500 and less than 1.

7. The display device of claim 1, wherein the additional protruding portion comprises a sharp protrusion tip at the top surface and a part of the light input surface.

8. The display device of claim 1, wherein the first protruding portion protrudes along the second direction and extends the entire length of the light guiding unit along the first direction.

9. The display device of claim 1, wherein the first protruding portion protrudes along the second direction and extends the entire length of the light-emitting elements along the first direction.

10. The display device of claim 1, wherein the curved convex connecting surface extends the entire length of the light guiding unit along the first direction.

11. A display device, comprising:
a display panel; and
a backlight module disposed corresponding to the display panel and comprising a light-emitting unit and a light guiding unit, wherein the light guiding unit has a light input surface, a bottom surface and a top surface, the light input surface connects the bottom surface and the top surface, the light-emitting unit has a plurality of light-emitting elements, the light-emitting elements are disposed along a first direction and adjacent to the light input surface, a second direction is a direction from the light input surface to the light-emitting unit, and a third direction is perpendicular to the first direction and the second direction;
wherein, the light guiding unit comprises a first protruding portion at the bottom surface, the first protruding portion comprises a sharp protrusion tip at the bottom surface and a part of the light input surface, the light input surface comprises a curved convex connecting surface, the curved convex connecting surface connects to the first protruding portion to form a turning portion, and the turning portion is disposed between the curved convex connecting surface and the first protruding portion;
wherein, the curved convex connecting surface is at an intermediate portion of the light input surface and outwardly protrudes toward the light-emitting elements along the second direction, and the light-emitting elements are across from the curved convex connecting surface and generally positioned above the first protruding portion in the third direction;
wherein the light guiding unit further comprises an additional protruding portion at the top surface, the light-emitting elements are generally positioned below the additional protruding portion in the third direction, and the first protruding portion and the additional protruding portion connect to two opposite sides of the curved convex connecting surface to respectively form the turning portion and an additional turning portion;
wherein the additional protruding portion comprises a sharp protrusion tip at the top surface and a part of the light input surface, and the first protruding portion and the additional protruding portion have different dimensions along the second direction.

12. The display device of claim 11, wherein the first protruding portion comprises a part of the bottom surface.

13. The display device of claim 12, wherein a shortest distance between the turning portion and the bottom surface along the third direction is greater than or equal to 0.18 μm and is less than or equal to 100 μm.

14. The display device of claim 11, wherein the sharp protrusion tip of the first protruding portion has a vertex, and a shortest distance between the vertex and the turning portion along the second direction is greater than or equal to 0.18 μm and is less than or equal to 30 μm.

15. The display device of claim 11, wherein the curved convex connecting surface is curved in the first direction and the third direction.

16. The display device of claim 15, wherein when viewing along the third direction, a ratio of a maximum protruding distance of the curved convex connecting surface along the second direction to a width of the light guiding unit along the first direction is greater than 1/500 and less than 1.

17. The display device of claim 11, wherein the additional protruding portion comprises a sharp protrusion tip at the top surface and a part of the light input surface.

18. The display device of claim 11, wherein the first protruding portion protrudes along the second direction and extends the entire length of the light guiding unit along the first direction.

19. The display device of claim 11, wherein the first protruding portion protrudes along the second direction and extends the entire length of the light-emitting elements along the first direction.

20. The display device of claim 11, wherein the curved convex connecting surface extends the entire length of the light guiding unit along the first direction.

* * * * *